United States Patent
Oishi et al.

(10) Patent No.: US 8,885,195 B2
(45) Date of Patent: Nov. 11, 2014

(54) IMAGE FORMING SYSTEM FOR ACCESSING IMAGE DATA FROM A PLURALITY OF IMAGE FORMING DEVICES BASED ON DEVICE FACSIMILE CAPABILITY OR DEVICE POWER-ON TIME

(75) Inventors: Masahiro Oishi, Tokyo (JP); Makoto Nishimura, Tokyo (JP); Kazuaki Ozawa, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 224 days.

(21) Appl. No.: 13/452,264

(22) Filed: Apr. 20, 2012

(65) Prior Publication Data
US 2013/0114103 A1 May 9, 2013

(30) Foreign Application Priority Data
Nov. 7, 2011 (JP) .................................. 2011-243318

(51) Int. Cl.
| | |
|---|---|
| G06F 3/12 | (2006.01) |
| H04N 1/00 | (2006.01) |
| H04N 1/327 | (2006.01) |
| G06K 15/00 | (2006.01) |

(52) U.S. Cl.
CPC .......... *H04N 1/00222* (2013.01); *G06F 3/1291* (2013.01); *H04N 2201/3205* (2013.01); *G06F 3/1267* (2013.01); *G06F 3/1238* (2013.01); *H04N 1/32771* (2013.01); *G06F 3/1204* (2013.01); *H04N 2201/3207* (2013.01)
USPC .......................................... 358/1.15; 358/1.16

(58) Field of Classification Search
USPC .............................. 358/1.15, 1.16, 1.14, 1.18
See application file for complete search history.

(56) References Cited

U.S. PATENT DOCUMENTS

| | | | |
|---|---|---|---|
| 6,862,583 B1 * | 3/2005 | Mazzagatte et al. ............. 705/64 |
| 2002/0122203 A1 * | 9/2002 | Matsuda ....................... 358/1.15 |
| 2006/0028678 A1 * | 2/2006 | Negishi et al. ................ 358/1.15 |
| 2006/0092453 A1 * | 5/2006 | Okada et al. .................. 358/1.14 |
| 2007/0171467 A1 * | 7/2007 | Mokuya et al. ............... 358/1.15 |
| 2007/0285713 A1 * | 12/2007 | Yamamoto et al. .......... 358/1.15 |
| 2008/0062465 A1 * | 3/2008 | Suzuki ......................... 358/1.18 |
| 2008/0244756 A1 | 10/2008 | Kitada |
| 2010/0235772 A1 * | 9/2010 | Ikeura ............................ 715/771 |
| 2012/0307309 A1 * | 12/2012 | Ikegaya et al. ................ 358/1.16 |
| 2012/0327457 A1 * | 12/2012 | Hoshina et al. .............. 358/1.15 |
| 2013/0088754 A1 * | 4/2013 | Ichimura et al. ............. 358/1.16 |
| 2013/0094051 A1 * | 4/2013 | Yamada et al. .............. 358/1.15 |

FOREIGN PATENT DOCUMENTS

JP 2008-242851 10/2008

\* cited by examiner

*Primary Examiner* — Houshang Safaipour
*Assistant Examiner* — Walter Yehl
(74) *Attorney, Agent, or Firm* — Oliff PLC

(57) ABSTRACT

An image forming system includes plural image forming devices, a determining unit determining an image forming device in which image data corresponding to user information is stored among the plural image forming devices, a first storage unit storing the user information and device information in a correlated manner, a transmitting device in which the user information is preset, a transmitting unit transmitting image data corresponding to the preset user information to the determined image forming device with respect to the user information, a second storage unit storing the transmitted image data, a receiving unit receiving an input of the user information, a first acquiring unit acquiring image data from an image forming device correlated with the input user information, and an image forming unit forming an image acquired by the first acquiring unit.

6 Claims, 25 Drawing Sheets

FIG. 7

| USER ID | SPOOLER INFORMATION ||
|---|---|---|
| | 1 | 2 |
| user001 | spoolerA | spoolerC |
| user002 | spoolerB | spoolerC |
| ... | ... | ... |

41a

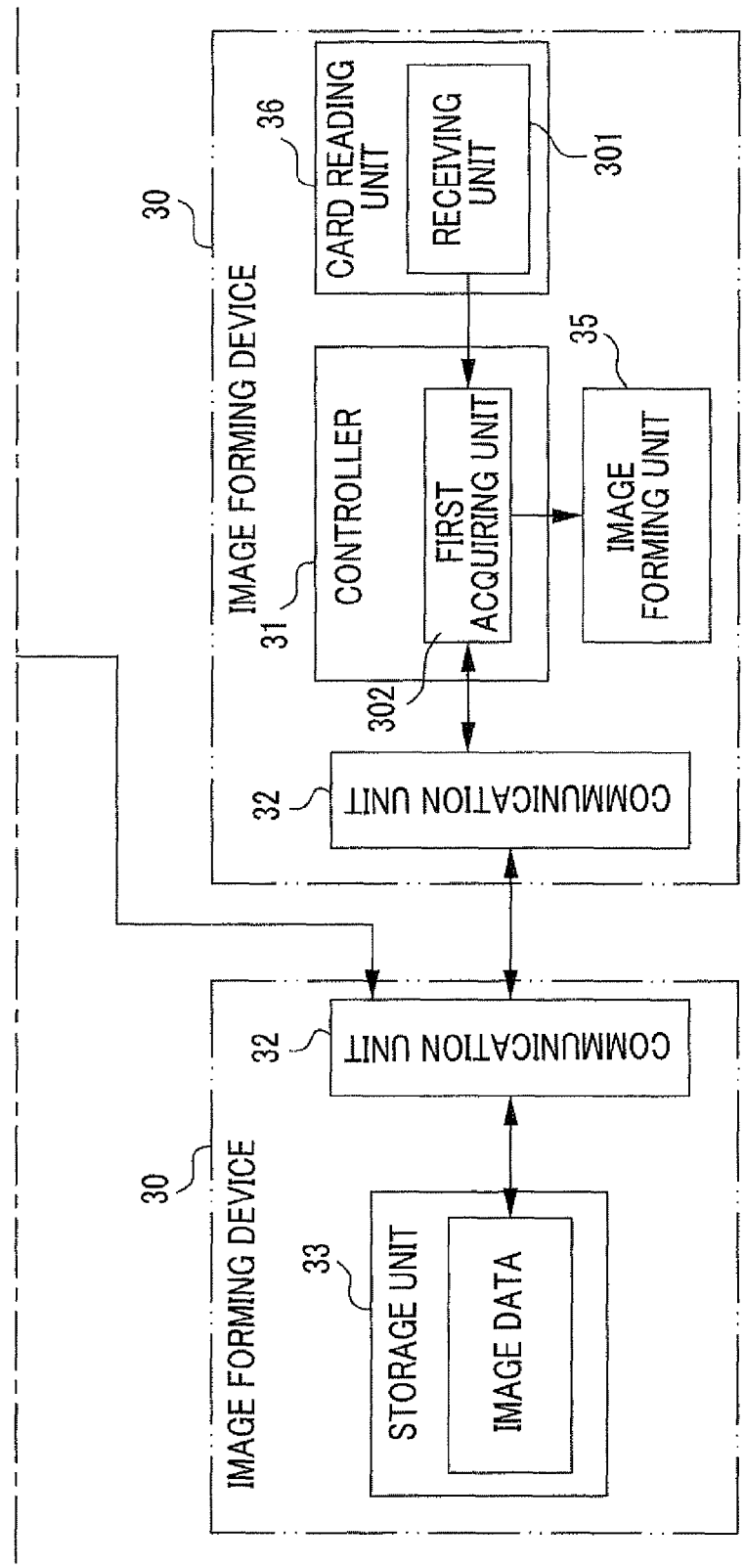

FIG. 9

| SPOOLER INFORMATION | FACSIMILE FUNCTION |
|---|---|
| spoolerC | ○ |

| PROCESSING TIME | USER ID | PROCESSING TYPE |
|---|---|---|
| 9/9/2011/10:30 | user001 | PRINT |
| 9/9/2011/10:35 | user002 | PRINT |
| 9/9/2011/10:40 | user001 | SCAN |

| USER ID | PRINT COUNT | | |
|---|---|---|---|
| | IMAGE FORMING DEVICE 30A | IMAGE FORMING DEVICE 30B | IMAGE FORMING DEVICE 30C |
| user001 | 1 | 5 | 1 |
| user002 | 0 | 10 | 0 |
| ... | ... | ... | ... |

| USER ID | SPOOLER INFORMATION | | |
|---|---|---|---|
| | 1 | 2 | 3 |
| user001 | spoolerB | spoolerA | spoolerC |
| user002 | spoolerB | spoolerC | ... |
| ... | ... | ... | ... |

41

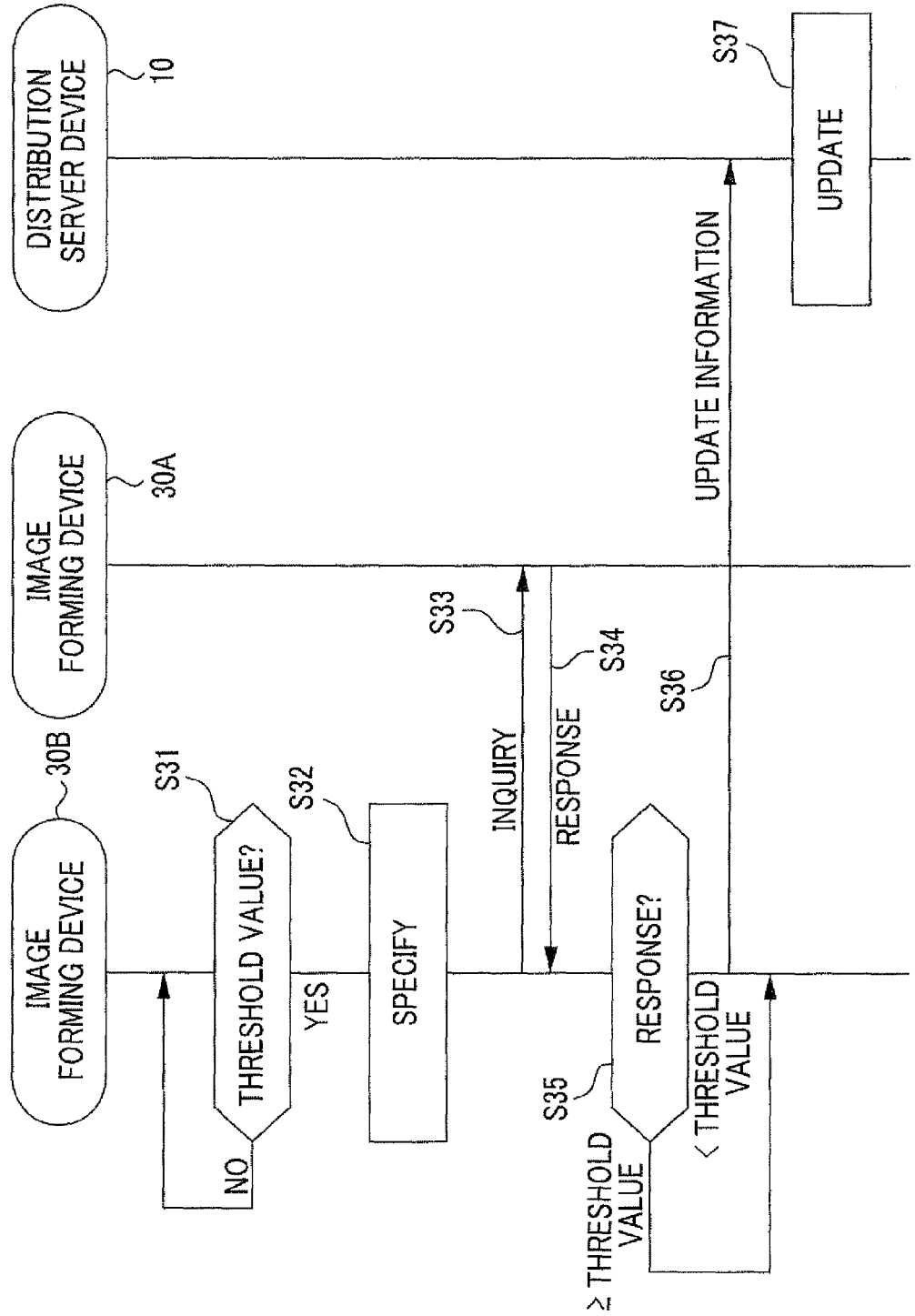

IMAGE FORMING SYSTEM FOR ACCESSING IMAGE DATA FROM A PLURALITY OF IMAGE FORMING DEVICES BASED ON DEVICE FACSIMILE CAPABILITY OR DEVICE POWER-ON TIME

CROSS-REFERENCE TO RELATED APPLICATIONS

This application is based on and claims priority under 35 USC 119 from Japanese Patent Application No. 2011-243318 filed Nov. 7, 2011.

BACKGROUND (i) Technical Field
The present invention relates to an image forming system.
(ii) Related Art
A technique of storing image data designated by a user in a print server device so that the image data may be accessed from plural image forming devices is known.

SUMMARY

According to an aspect of the present invention, there is provided an image forming system including:
plural image forming devices;
a determining unit that determines an image forming device in which image data corresponding to user information is stored among the plural image forming devices;
a first storage unit that stores the user information and device information indicating the image forming device determined by the determining unit in a correlated manner;
a transmitting device in which the user information is preset;
a transmitting unit that is provided in the transmitting device and transmits image data corresponding to the preset user information to the image forming device determined by the determining unit with respect to the user information;
a second storage unit that is provided in each of the image forming devices and stores the image data transmitted by the transmitting unit;
a receiving unit that is provided in each of the image forming devices and receives an input of the user information;
a first acquiring unit that is provided in each of the image forming devices and acquires image data corresponding to the input user information from an image forming device correlated with the input user information indicated by the device information stored in the first storage unit; and
an image forming unit that is provided in each of the image forming devices and forms an image corresponding to the image data acquired by the first acquiring unit.

BRIEF DESCRIPTION OF THE DRAWINGS

Exemplary embodiments of the present invention will be described in detail based on the following figures, wherein:
FIG. 7 is a diagram showing an example of user information stored in the image forming device;
FIG. 9 is a diagram showing an example of a facsimile list;
FIG. 16 is a diagram showing an example of log information;
FIG. 18 is a diagram showing an example of aggregate information;
FIG. 19 is a diagram showing an example of user information after updating;
FIG. 25 is a sequence chart showing a user information updating operation according to Modification Example 8.

DETAILED DESCRIPTION

1. Configuration of Image Forming System

Figure 1:
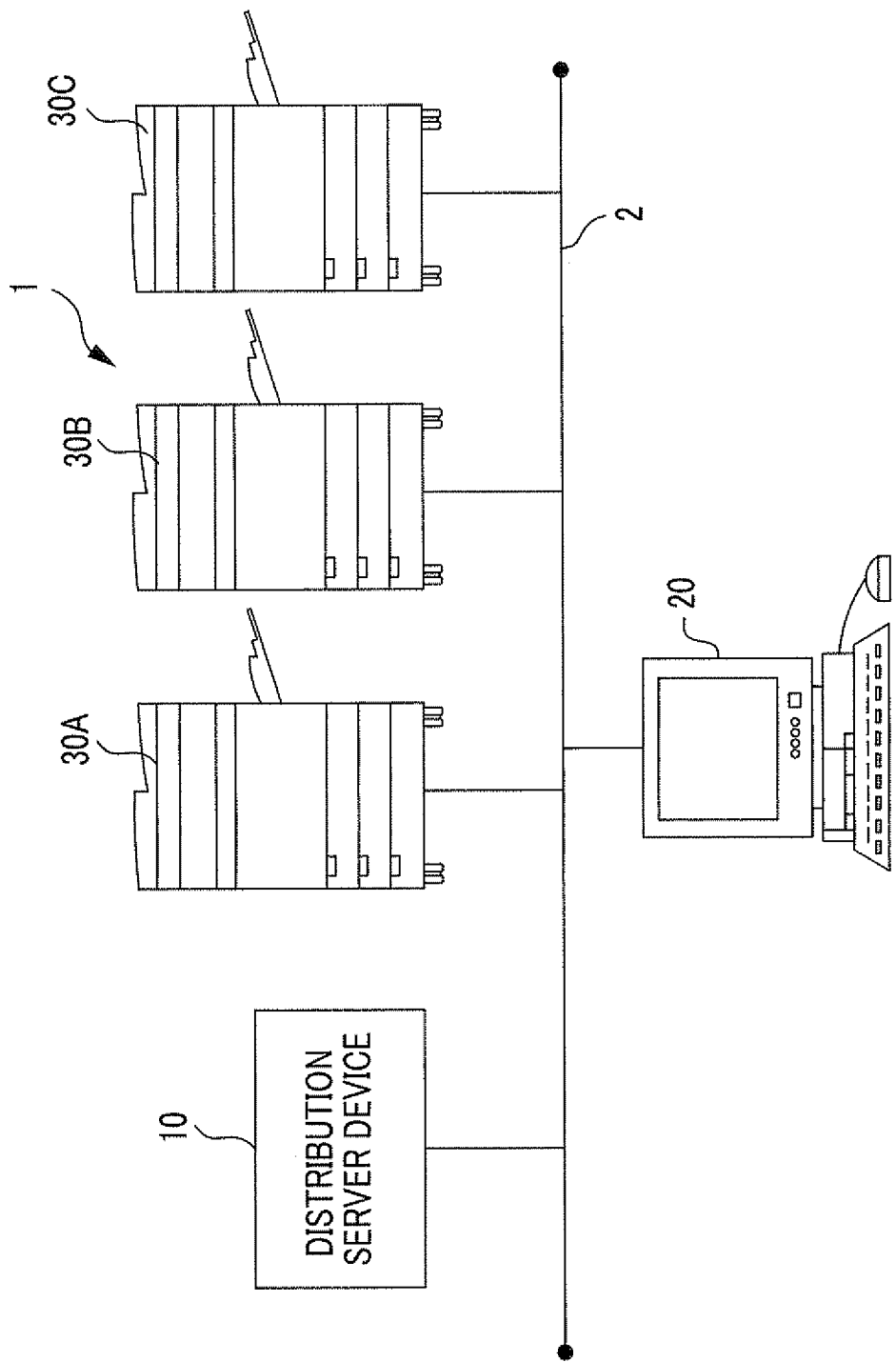
FIG. 1 is a schematic diagram showing the configuration of an image forming system.

FIG. 1 is a schematic diagram showing the configuration of an image forming system 1 according to the first exemplary embodiment. The image forming system 1 includes a distribution server device 10, a client device 20, and image forming devices 30A, 30B, and 30C. The distribution server device 10, the client device 20, and the image forming devices 30A, 30B, and 30C are connected to each other via a communication line 2. The image forming system 1 has a structure such that a user may store image data in any of the image forming devices 30 and form an image corresponding to the image data using any one of the image forming devices 30. In the following description, the image forming devices 30A, 30B, and 30O may sometimes be collectively referred to as "image forming devices 30" when they need not be distinguished from each other.

Figure 2:
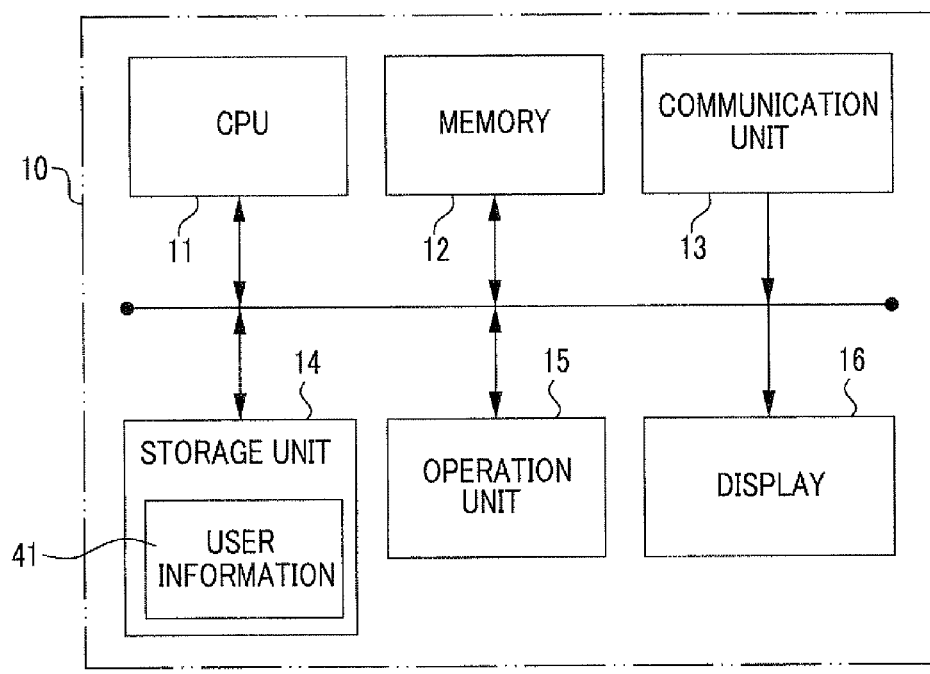
FIG. 2 is a diagram showing a hardware configuration of a distribution server device.

FIG. 2 is a diagram showing a hardware configuration of the distribution server device 10. The distribution server device 10 includes a central processing unit (CPU) 11, a memory 12, a communication unit 13, a storage unit 14, an operation unit 15, and a display 16. The CPU 11 controls each unit of the distribution server device 10 by executing a program stored in the memory 12. The communication unit 13 is a communication interface connected to the communication line 2. The distribution server device 10 communicates with the client device 20 or the image forming device 30 using the communication unit 13. The storage unit 14 is a storage device such as a hard disk. User information 41 is stored in the storage unit 14. The operation unit 15 includes a keyboard and a mouse, for example. The operation unit 15 is used for operating the distribution server device 10. The display 16 is a display device such as a liquid crystal display.

Figure 3:
FIG. 3 is a diagram showing an example of user information stored in the distribution server device.

FIG. 3 is a diagram showing an example of the user information 41. In the user information 41, a user ID is correlated with plural spooler information. The user ID is information for identifying a user. The spooler information is information indicating the image forming device 30 in which image data are stored. As the spooler information, an Internet protocol (IP) address or an identification number allocated to an image forming device, for example, are used. The spooler information "spoolerA," "spoolerB," and "spoolerC" shown in FIG. 3 represent the image forming devices 30A, 30B, and 30C, respectively. Moreover, a priority order is allocated to the spooler information. The numbers "1," "2," and "3" shown in FIG. 3 represent the priority orders allocated to the spooler information, respectively. In the following description, spooler information to which the priority order "1" is allocated is referred to as "primary spooler information," and spooler information to which the priority order "2" is allocated is referred to as "secondary spooler information."

In the user information 41 shown in FIG. 3, primary spooler information "spoolerA" and secondary spooler information "spoolerC" are correlated with the user ID "user001." This means that image data corresponding to the user ID "user001" are stored in the image forming device 30A or the image forming device 30C. In this case, the image forming device 30A is used preferentially to the image forming device 30C.

Figure 4:
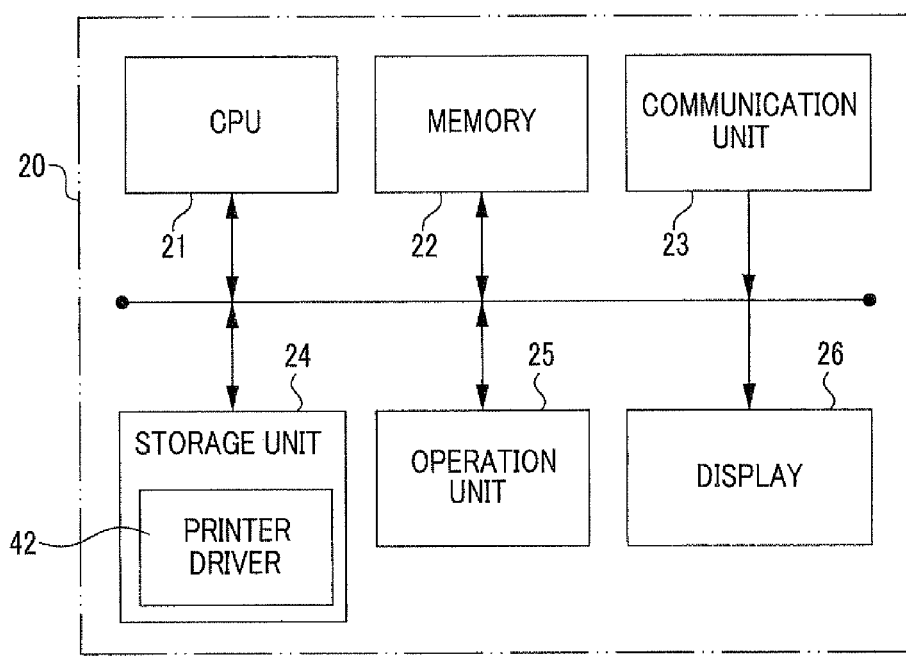
FIG. 4 is a diagram showing a hardware configuration of a client device.

FIG. 4 is a diagram showing a hardware configuration of the client device 20. The client device 20 includes a CPU 21, a memory 22, a communication unit 23, a storage unit 24, an operation unit 25, and a display 26. The CPU 21 controls each unit of the client device 20 by executing a program stored in the memory 22. The communication unit 23 is a communication interface connected to the communication line 2. The client device 20 communicates with the distribution server device 10 or the image forming device 30 using the communication unit 23. The storage unit 24 is a storage device such as a hard disk. A printer driver 42 is stored in the storage unit 24. The printer driver 42 is a program having a function of controlling the image forming device 30. The operation unit 25 includes a keyboard and a mouse, for example. The operation unit 25 is used for operating the client device 20. The display 26 is a display device such as a liquid crystal display.

Figure 5:
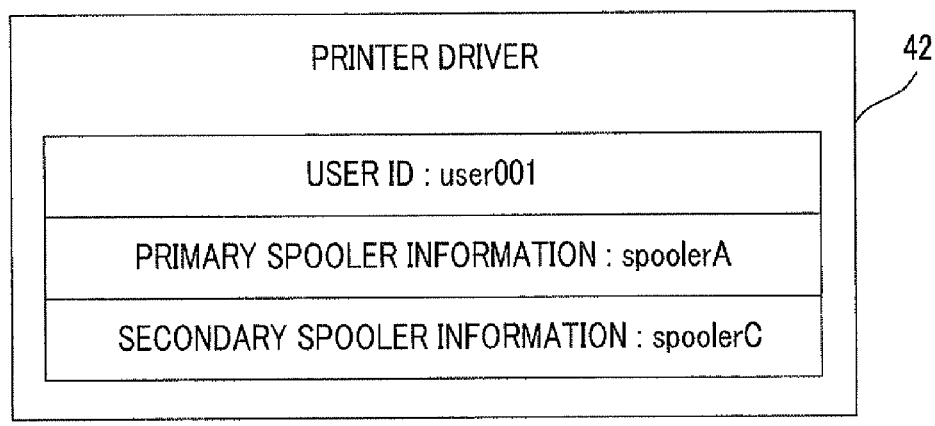
FIG. 5 is a diagram showing an example of information set on a printer driver.

Information necessary for transmitting image data to the image forming device 30 is set in the printer driver 42. FIG. 5 is a diagram showing an example of the information set in the printer driver 42. In the printer driver 42, the user ID "user001," the primary spooler information "spoolerA," and the secondary spooler information "spoolerC" included in the user information 41 shown in FIG. 3 are set. Only the primary spooler information and the secondary spooler information are set in the printer driver 42, and spooler information to which the priority order "3" is allocated is not set in the printer driver 42.

Figure 6:
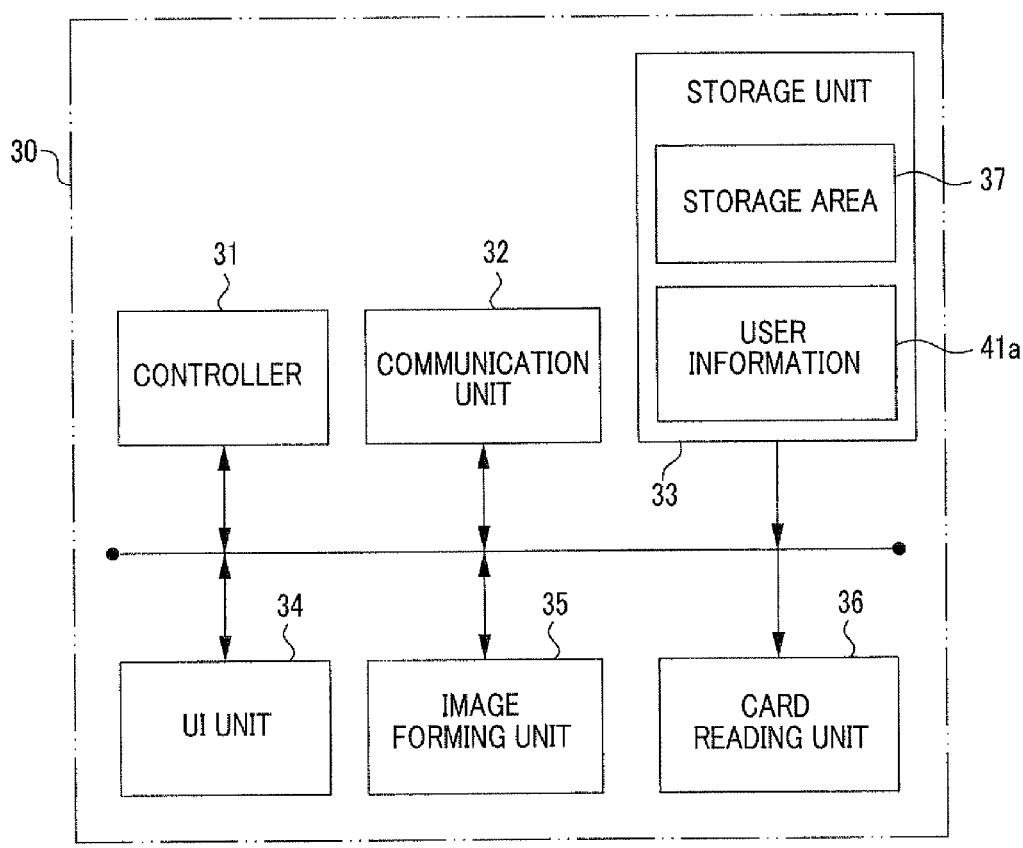
FIG. 6 is a diagram showing a hardware configuration of an image forming device according to an exemplary embodiment.

FIG. 6 is a diagram showing a hardware configuration of the image forming device 30. The image forming device 30 includes a controller 31, a communication unit 32, a storage unit 33, a user interface (UI) unit 34, an image forming unit 35, and a card reading unit 36. The controller 31 controls each unit of the image forming device 30. The controller 31 includes a CPU and a memory, for example. The CPU implements the function of the controller 31 by executing a program stored in the memory. The communication unit 32 is a communication interface connected to the communication line 2. The image forming device 30 communicates with the distribution server device 10, the client device 20, or the image forming device 30 using the communication unit 32. The storage unit 33 is a storage device such as a hard disk or a flash memory. The storage unit 33 includes a storage area 37 in which the image data are stored. Moreover, user information 41a corresponding to the above-described user information 41 is stored in the storage unit 33.

The UI unit 34 includes a touch screen and an operation button, for example. The UI unit 34 is used for operating the image forming device 30. The image forming unit 35 is an electrophotographic printer, for example. The image forming unit 35 forms (prints) an image corresponding to the image data on a medium such as paper. The card reading unit 36 reads information stored in an integrated circuit (IC) card in a non-contact manner. The IC card is provided to a user in advance in order to perform authentication of the user. The user ID included in the above-described user information 41 is stored in the IC card. The image forming device 30 may include a configuration realizing the function of a scanner, a facsimile, and the like in addition to the above-described configuration. In the following description, when the configurations of the image forming devices 30A, 30B, and 30C need to be distinguished from each other, characters "A," "B," and "C" will be added to reference symbols of the configurations thereof.

FIG. 7 is a diagram showing an example of user information 41a. The user information 41a includes the same user ID and the same spooler information as the user information 41 shown in FIG. 3. Only the primary spooler information and the secondary spooler information are included in the user information 41a, and spooler information to which the priority order "3" is allocated is not included in the user information 41a.

Figure 8:
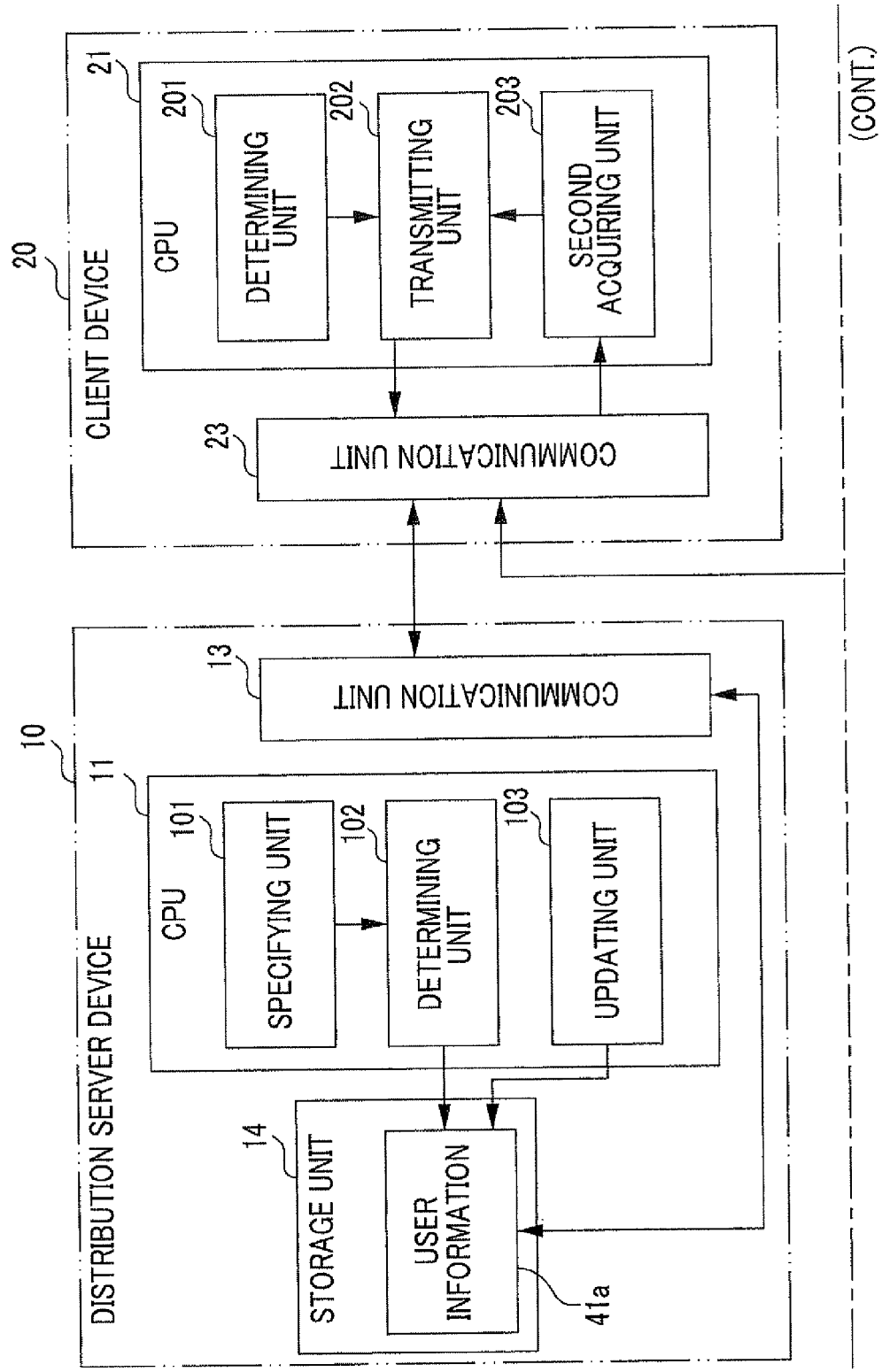
FIG. 8 is a diagram showing the functional configurations of the image forming system.

FIG. 8 is a diagram showing the functional configurations of the image forming system 1. Respective image forming devices 30 have the same functional configuration. In FIG. 8, the functional configurations of one of the image forming devices 30 are not illustrated for the other image forming devices 30. In this exemplary embodiment, the client device 20 functions as a transmitting device. The specifying unit 101, the determining unit 102, and the updating unit 103 are implemented when the CPU 11 executes a program. The determining unit 201, the transmitting unit 202, and the second acquiring unit 203 are implemented when the CPU 21 executes a program. The receiving unit 301 is implemented by the card reading unit 36. The first acquiring unit 302 is implemented when the CPU in the controller 31, for example, executes a program. These functional configurations of the distribution server device 10, the client device 20, or the image forming device 30 may be implemented by a single program and may be implemented by plural programs.

The specifying unit 101 specifies the image forming device 30 having a facsimile function. The determining unit 102 determines plural image forming devices 30 in which image data corresponding to a predetermined user ID are stored among the image forming devices 30A, 30B, and 30C. The user ID is an example of user information for identifying the user. The plural image forming devices determined by the determining unit 102 include an image forming device which is unlikely to be turned off. The image forming device 30 which is unlikely to be turned off is the image forming device 30 of which the state or attribute satisfies a condition determined in advance as the state or attribute of an image forming device 30 which is unlikely to be turned off. In this exemplary embodiment, the plural image forming devices 30 include the image forming device 30 specified by the specifying unit 101. The storage unit 14 stores a predetermined user ID and spooler information indicating the image forming device 30 determined by the determining unit 102 in a correlated manner. The spooler information is an example of device information indicating the image forming device 30. That is, in this exemplary embodiment, the storage unit 14 is used as a first storage unit. The updating unit 103 updates the spooler information stored in the storage unit 14.

The communication line 2 is divided into plural sub-networks. When the client device 20 is connected to one sub-network, the determining unit 201 determines the image forming device 30 connected to the sub-network. A user ID is set in advance in the client device 20. The transmitting unit 202 transmits image data corresponding to the preset user ID to the image forming device 30 which is determined by the determining unit 102 or the determining unit 201 with respect to the user ID. The second acquiring unit 203 acquires spooler information stored in the storage unit 14 so as to be correlated with the preset user ID at a predetermined time. When the spooler information is acquired by the second acquiring unit 203, the transmitting unit 202 transmits the image data corresponding to the preset user ID to the image forming device 30 indicated by the spooler information.

The storage unit 33 stores the image data transmitted by the transmitting unit 202. That is, in this exemplary embodiment, the storage unit 33 is used as a second storage unit. The receiving unit 301 receives the input of the user ID. The first acquiring unit 302 acquires the image data corresponding to the input user ID from the image forming device 30 indicated by the spooler information stored in the storage unit 14 so as to be correlated with the input user ID. Practically, the first acquiring unit 302 acquires the image data based on the user information 41a stored in the storage unit 33. However, as described above, the same user ID and the same spooler information as the user information 41 stored in the distribution server device 10 are included in the user information 41a. Thus, it may be said that the first acquiring unit 302 acquires the image data based on the spooler information stored in the distribution server device 10. The image forming unit 35 forms an image corresponding to the image data acquired by the first acquiring unit 302.

2. Operation of Image Forming System (1) Initial Setting Operation

At the first time of use, only a predetermined user ID is included in the user information 41 stored in the distribution server device 10, and the spooler information is not included. Moreover, only the user ID is set in the printer driver 42 of the client device 20, and the spooler information is not set. Therefore, at the initial time of use, a process of setting spooler information to the user ID is performed. As a method of setting spooler information, a method (hereinafter referred to as "the first initial setting operation") of correlating the user ID with the spooler information on the distribution server device 10 side, and a method (hereinafter referred to as "the second initial setting operation") of correlating them with each other on the client device 20 side may be used. Hereinafter, the respective methods will be described.

(i) First Initial Setting Operation

When the first initial setting operation is employed, the client device 20 does not need to include the determining unit 201 among the functional configurations shown in FIG. 8. In the storage unit 14 of the distribution server device 10, a facsimile list 46 is stored in addition to the above-described user information 41. FIG. 9 is a diagram showing an example of the facsimile list 46. In the facsimile list 46, the spooler information indicating the image forming device 30 having a facsimile function is described. In the facsimile list 46 shown in FIG. 9, spooler information "spoolerC" indicating the image forming device 30C is described. This means that the image forming device 30C has a facsimile function. Since the image forming devices 30A and 30B do not have a facsimile function, spooler information indicating these image forming devices 30 are not described in the facsimile list 46.

Figure 10:
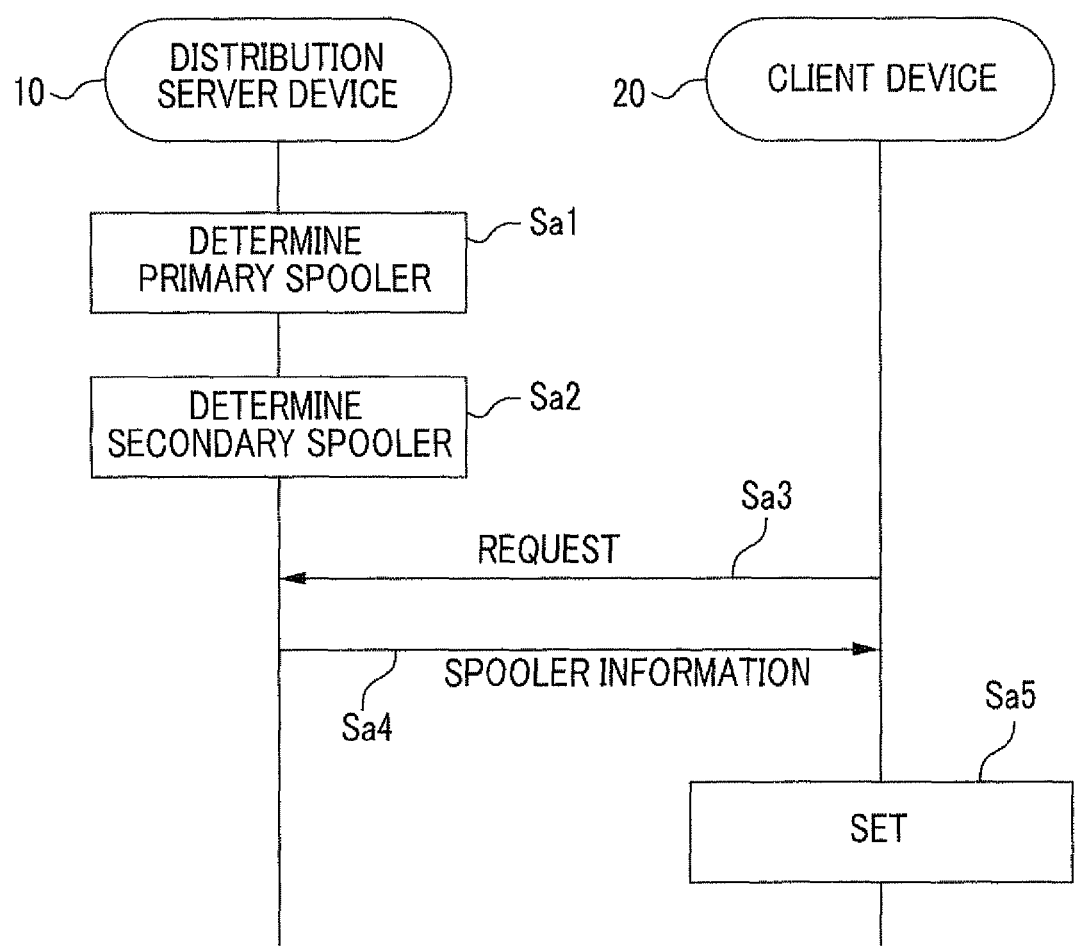
FIG. 10 is a sequence chart showing the first initial setting operation.

FIG. 10 is a sequence chart showing the first initial setting operation. The distribution server device 10 determines a primary spooler with respect to each of the user IDs included in the user information 41 (step Sa1). The primary spooler means the image forming device 30 having the highest priority order, which serves as a storage destination of the image data corresponding to the user ID. Specifically, the CPU 11 determines the image forming device 30 randomly selected among the image forming devices 30A, 30B, and 30C with respect to each of the user IDs included in the user information 41. In this example, it is assumed that the image forming device 30A is determined with respect to the user ID "user001." In this case, the CPU 11 adds "spoolerA" indicating the image forming device 30A to the user information 41 stored in the storage unit 14 as primary spooler information corresponding to the user ID "user001." In this way, as shown in FIG. 3, the user ID "user001" and the primary spooler information "spoolerA" are stored in a correlated manner.

Subsequently, the distribution server device 10 determines a secondary spooler with respect to each of the user IDs included in the user information 41 (step Sa2). The secondary spooler means the image forming device 30 having the second highest priority order, which serves as a storage destination of the image data corresponding to the user ID. The image forming device 30 which is unlikely to be turned off by the user is determined as the secondary spooler. Specifically, the CPU 11 specifies the image forming device 30 having a facsimile function based on the facsimile list 46 stored in the storage unit 14. In the facsimile list 46 shown in FIG. 9, spooler information "spoolerC" indicating the image forming device 30C is described. In this case, the CPU 11 specifies the image forming device 30C. The CPU 11 adds "spoolerC" indicating the image forming device 30C to the user information 41 stored in the storage unit 14 as the secondary spooler information corresponding to each user ID. In this way, as shown in FIG. 3, each user ID and the secondary spooler information "spoolerC" are stored in a correlated manner.

The client device 20 acquires spooler information from the distribution server device 10 when the first print instruction is issued. As shown in FIG. 5, the user ID "user001" is set in the printer driver 42. In this case, the CPU 21 controls the communication unit 23 to send a request for the spooler information corresponding to the user ID to the distribution server device 10 (step Sa3). The distribution server device 10 reads the spooler information requested from the client device 20 from the storage unit 14 and transmits the spooler information to the client device 20 (step Sa4). In the user information 41 shown in FIG. 3, the primary spooler information "spoolerA" and the secondary spooler information "spoolerC" are correlated with the user ID "user001." In this case, the CPU 11 extracts these spooler information from the user information 41 stored in the storage unit 14 and controls the communication unit 13 to transmit the extracted spooler information to the client device 20. Upon receiving the spooler information from the distribution server device 10, the client device 20 sets the received spooler information in the printer driver 42 (step Say). In this way, as shown in FIG. 5, the primary spooler information "spoolerA" and the secondary spooler information "spoolerC" are set in the printer driver 42.

According to the first initial setting operation, the image forming device 30 having a facsimile function is determined as the secondary spooler. The image forming device 30 having a facsimile function is highly unlikely to be turned off by the user even in the night, for example. Thus, the occurrence of a situation where it is not possible to store image data in any image forming device 30 is suppressed.

(ii) Second Initial Setting Operation

Figure 11:
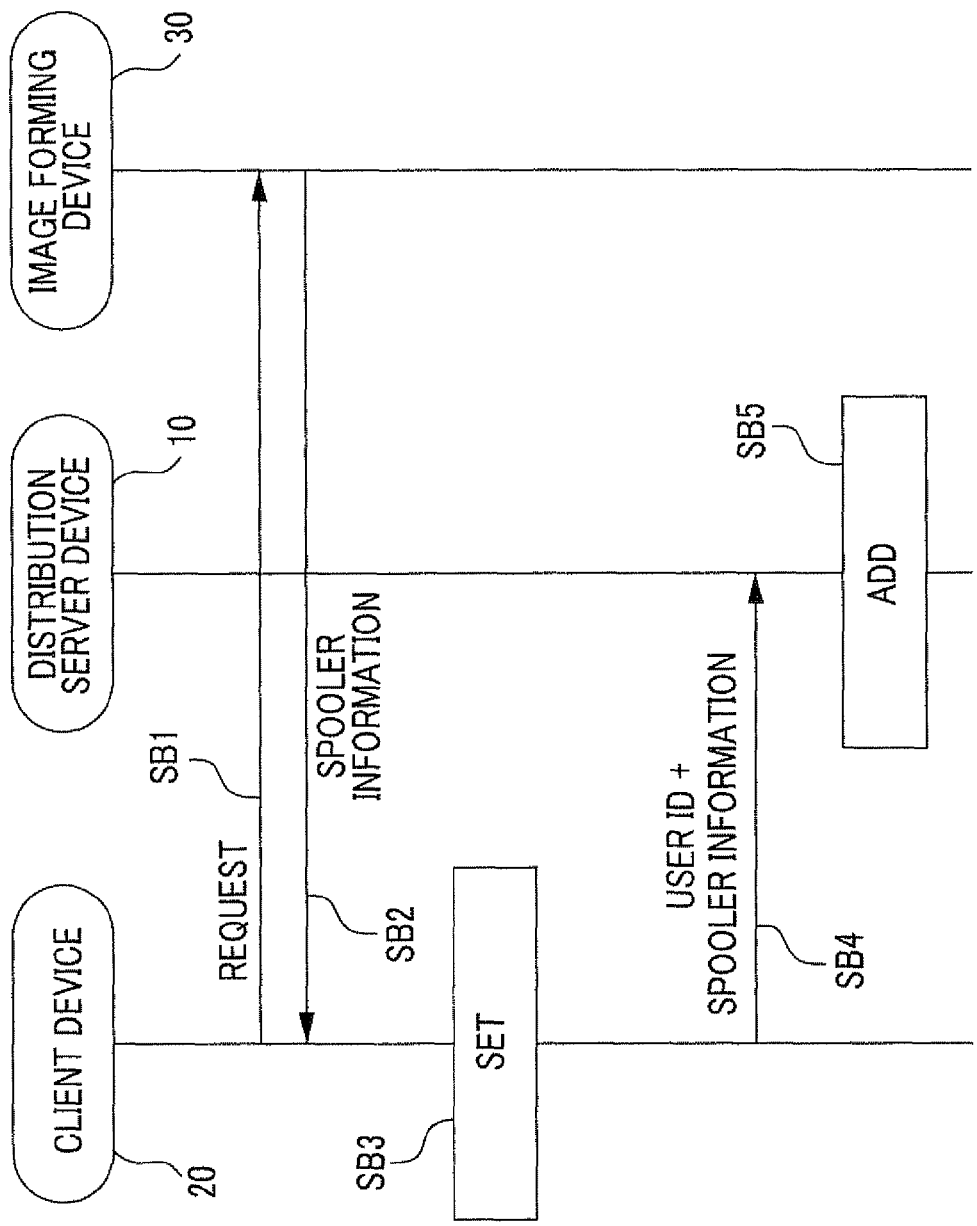
FIG. 11 is a sequence chart showing the second initial setting operation.

When the second initial setting operation is employed, the distribution server device 10 does not need to include the specifying unit 101 and the determining unit 102 among the functional configurations shown in FIG. 8. FIG. 11 is a sequence chart showing the second initial setting operation. The communication line 2 is divided into plural sub-networks. When the printer driver 42 is installed, the client device 20 acquires spooler information indicating the image forming device 30 connected to the same sub-network as the own device from the image forming device 30. For example, it is assumed that the client device 20 and the image forming devices 30A, 30B, and 30C are connected to the same sub-network. In this case, the CPU 21 controls the communication unit 23 to send a request for the spooler information indicating the image forming devices 30 to the image forming devices 30A, 30B and 30C (step SB1). The client device 20 specifies the image forming device 30 connected to the same sub-network as the own device based on an IP address allocated to the image forming device 30, for example. In response to this request, the image forming devices 30A, 30B, and 30C transmit the spooler information "spoolerA," "spoolerB," and "spoolerC" indicating the own devices, respectively, to the client device 20 (step SB2).

Upon receiving the spooler information from the image forming devices 30A, 30B, and 30C, the client device 20 sets the spooler information in the printer driver 42 based on the received spooler information (step SB3). Specifically, the CPU 21 determines two image forming devices 30 randomly selected among the image forming devices 30A, 30B, and 30C indicated by the received spooler information "spoolerA," "spoolerB," and "spoolerC" with respect to the user ID "user001" set in the printer driver 42. In this example, it is assumed that the image forming devices 30A and 30C are determined with respect to the user ID "user001" In this case, the CPU 11 sets the spooler information "spoolerA" and "spoolerC" indicating the image forming devices 30A and 30C in the printer driver 42. In this case, the CPU 11 sets the spooler information of one image forming device 30 as the primary spooler information and sets the spooler information indicating the other image forming device 30 as the secondary spooler information. In this example, it is assumed that the spooler information "spoolerA" indicating the image forming device 30A is set as the primary spooler information, and the spooler information "spoolerC" indicating the image forming device 30C is set as the secondary spooler information. In this way, as shown in FIG. 5, the primary spooler information "spoolerA" and the secondary spooler information "spoolerC" are set in the printer driver 42.

The client device 20 transmits the user ID and the spooler information set in the printer driver 42 to the distribution server device 10 (step SB4). Specifically, the CPU 21 controls the communication unit 23 to transmit the user ID "user001," the primary spooler information "spoolerA," and the secondary spooler information "spoolerC" to the distribution server device 10.

Upon receiving the user ID and the spooler information from the client device 20, the distribution server device 10 adds the spooler information to the user information 41 based on the received user ID and spooler information (step SB5). Specifically, the CPU 11 adds "spoolerA" and "spoolerC" to the user information 41 stored in the storage unit 14 as the primary spooler information and the secondary spooler information corresponding to the user ID "user001." In this way, as shown in FIG. 3, the user ID "user001," the primary spooler information "spoolerA," and the secondary spooler information "spoolerC" are stored in a correlated manner. Although only one client device 20 is illustrated in FIG. 1, when there are a number of client devices 20, the distribution server device 10 performs the process of step SB5 whenever the user ID and the spooler information are received from these client devices 20. In this way, the user information 41 as shown in FIG. 3 is created.

According to the second initial setting operation, the spooler information indicating the image forming device 30 connected to the same sub-network as the client device 20 is set in the printer driver 42. In this way, image data are stored in the image forming device 30 connected to the same sub-network as the client device 20. In general, devices connected to the same sub-network are often disposed at a short distance. In this case, the image data transmitted from the client device 20 are stored in the image forming device 30 disposed near the client device 20.

(2) Print Operation

Figure 12:
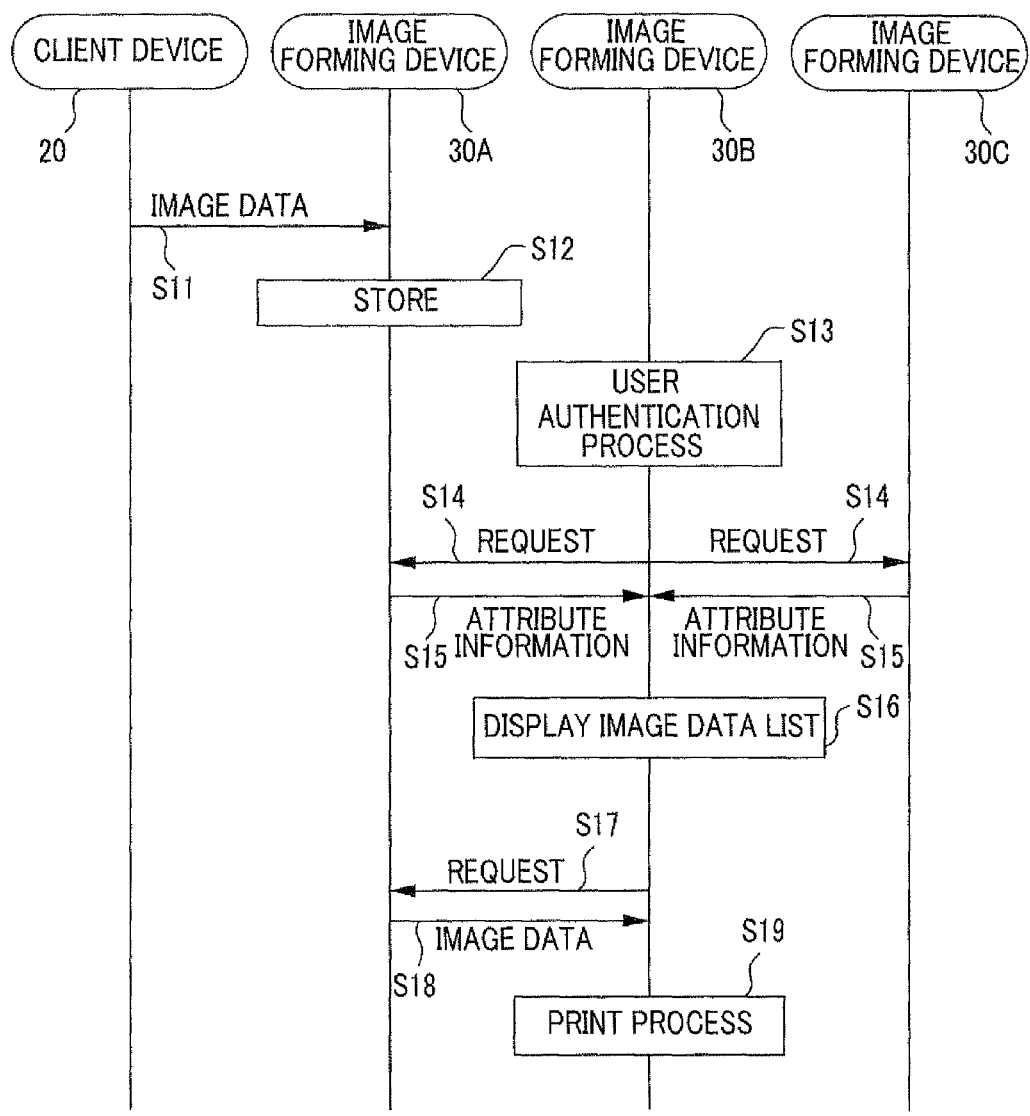
FIG. 12 is a sequence chart showing a print operation.

FIG. 12 is a sequence chart showing a print operation. The user operates the client device 20 to input a print instruction. Specifically, the user designates image data using the operation unit 25 and issues a print instruction. In this example, it is assumed that the user issues a print instruction by designating image data D1.

Upon receiving a print instruction, the client device 20 transmits image data D1 to the image forming device 30 based on the information set in the printer driver 42 (step S11). Specifically, the user ID "user001," the primary spooler information "spoolerA" and the secondary spooler information "spoolerC" are set in the printer driver 42 as shown in FIG. 5. In this case, the CPU 21 appends the attribute information including the user ID "user001" to the image data D1. In this way, the image data D1 is used as image data corresponding to the user ID "user001." Moreover, in addition to the user ID, information such as a file name for specifying the image data D1 is included in the attribute information.

After appending the attribute information, the CPU 21 controls the communication unit 23 to transmit the image data D1 to the image forming device 30A indicated by the primary spooler information "spoolerA." However, when a failure occurs in the image forming device 30A or a failure occurs in the communication line 2 between the client device 20 and the image forming device 30A, it is not possible to transmit the image data D1 to the image forming device 30A. As above, in a state where it is not possible to use the image forming device 30A, the CPU 21 controls the communication unit 23 to transmit the image data D1 to the image forming device 30C indicated by the secondary spooler information "spoolerC."

That is, the client device 20 transmits the image data corresponding to the user ID to the image forming device 30 which is available and indicated by spooler information having the highest priority order allocated thereto among the image forming devices 30 indicated by the spooler information set in the printer driver 42. Here, "available" means that image data may be stored in the image forming device 30. Whether the image forming device 30 is available or not is determined, for example, by transmitting an echo request to the image forming device 30 and determining whether an echo response is returned from the image forming device 30. When the image forming device 30 and the communication line 2 are operating properly, an echo response is returned from the image forming device 30. On the other hand, if a failure occurs in the image forming device 30 or a failure occurs in the communication line 2 between the client device 20 and the image forming device 30, an echo response is not returned from the image forming device 30. When no echo response is returned in a designated period, the client device 20 determines that the image forming device 30 is in an unavailable state.

In this example, it is assumed that the image forming device 30A is available. In this case, the image data D1 is transmitted from the client device 20 to the image forming device 30A. Upon receiving the image data D1 from the client device 20, the image forming device 30A stores the image data D1 in a storage area 37A of the storage unit 33A. In this way, the image data D1 is stored in the image forming device 30A (step S12).

After issuing the print instruction, the user moves to a place where one of the image forming devices 30A, 30B, and 30C is located. For example, the user may move to a place where the image forming device 30 usually used by the user is located. When the image forming device 30 usually used by the user is being used by another user, the user may move to a place where the nearby image forming device 30 is located. Moreover, the user may move to a place where the image forming device 30 nearest to the present location of the user is located. That is, the user moves to the place of the image forming device 30 so that the user may use any one of the image forming devices 30A, 30B, and 30C. In this example, it is assumed that the user moves to the place of the image forming device 30B.

An authentication screen is displayed on the UI unit 34 of the image forming device 30, and unless authentication is performed, the operation on the image forming device 30 is not received. The user performs authentication by passing an IC card thereof over a card reading unit 36B in order to use the image forming device 30B. When the user ID is input via the card reading unit 36B, the image forming device 30B performs a user authentication process using the user ID (step S13).

Figure 13:
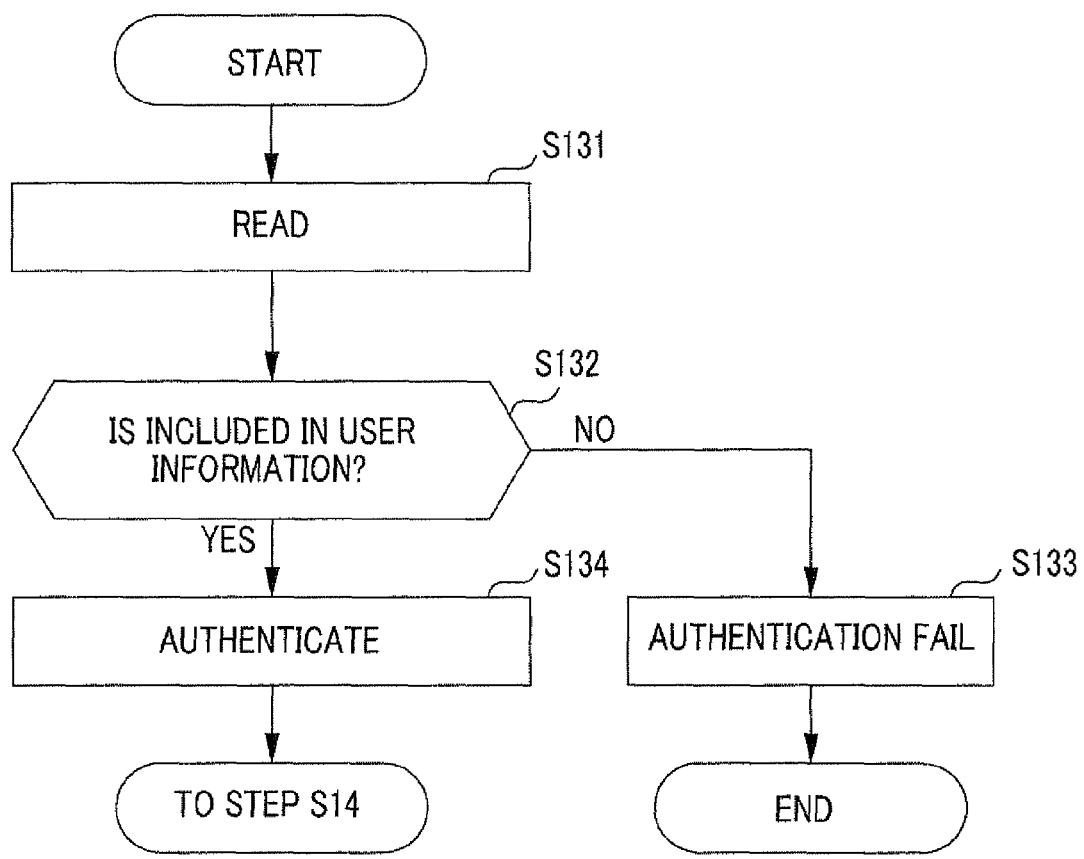
FIG. 13 is a flowchart showing a user authentication process.

FIG. 13 is a flowchart showing a user authentication process. In this example, it is assumed that a user ID "user001" is stored in the IC card. In this case, the card reading unit 36B reads the user ID "user001" from the IC card (step S131). A controller 31B determines whether or not the user ID "user001" is included in the user information 41a stored in the storage unit 33B (step S132). For example, when the user ID "user001" is not included in the user information 41a (step S132: NO), the controller 31B displays a message indicating authentication failure on the UI unit 34B (step S133), and this process ends. In this case, it is not possible for the user to use the image forming device 30B. On the other hand, as shown in FIG. 7, when the user ID "user001" is included in the user information 41a (step S132: YES), the controller 31B authenticates the user as an authenticated user (step S134), and the flow proceeds to the next step S14.

The image forming device 30B acquires the attribute information of image data corresponding to the user ID "user001" based on the user information 41a stored in the storage unit 33B. Specifically, as shown in FIG. 7, in the user information 41a, the primary spooler information "spoolerA" and the secondary spooler information "spoolerC" are correlated with the user ID "user001." In this case, the controller 31B controls the communication unit 32B to send a request for the attribute information of image data corresponding to the user ID "user001" to the image forming device 30A indicated by the primary spooler information "spoolerA" and the image forming device 30C indicated by the secondary spooler information "spoolerC" (step S14).

The image forming devices 30A and 30C transmit the attribute information to the image forming device 30B when the image forming devices 30A and 30C possess the attribute information requested from the image forming device 30B (step S15). As described above, the image data D1 is stored in the storage unit 33A of the image forming device 30A. The attribute information including the user ID "user001" is appended to the image data D1. In this case, the controller 31A reads the attribute information from the storage unit 33A and controls the communication unit 32A to transmit the attribute information to the image forming device 30B. Moreover, it is assumed that the image data D2 corresponding to a user ID "user001" is stored in the storage unit 330 of the image forming device 30C. Similarly to the image data D1, the attribute information including the user ID "user001" is appended to the image data D2. In this case, the controller 31C reads the attribute information from the storage unit 33C and controls the communication unit 32C to transmit the attribute information to the image forming device 305. The image forming device 30B receives these attribute information from the image forming devices 30A and 30C.

Figure 14:
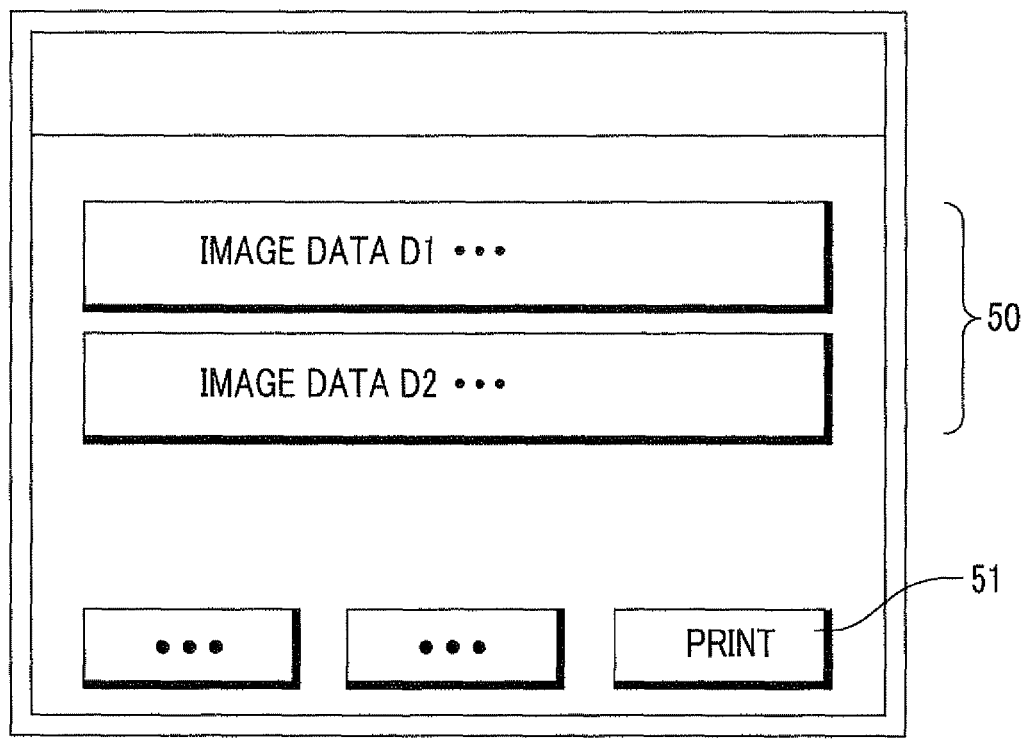
FIG. 14 is a diagram showing an example of an image data list.

Upon acquiring the attribute information, the image forming device 30B creates an image data list 50 using the attribute information and displays the image data list 50 on the UI unit 34B (step S16). FIG. 14 is a diagram showing an example of the image data list 50. In the image data list 50, the attribute information of the image data D1 acquired from the image forming device 30A and the attribute information of the image data D2 acquired from the image forming device 30C are arranged in a line. Moreover, a "PRINT" button 51 for receiving a print instruction is displayed on the UI unit 34B together with the image data list 50. The user selects desired image data based on the image data list 50 displayed on the UI unit 34 and presses the "PRINT" button 51. In this example, it is assumed that the image data D1 is selected and the "PRINT" button 51 is pressed.

When the "PRINT" button 51 is pressed, the image forming device 30B acquires the image data D1 from the image forming device 30 in which the image data D1 is stored. Specifically, the controller 31B controls the communication unit 32B to send a request for the image data D1 to the image forming device 30A which transmitted the attribute information of the image data D1 (step S17). The image forming device 30A reads the image data D1 requested from the image forming device 30B from the storage unit 33A and transmits the image data D1 to the image forming device 30B (step S18). The image forming device 30B receives the image data D1 from the image forming device 30A.

Upon acquiring the image data D1, the image forming device 30B performs printing based on the image data D1 (step S19). Specifically, the controller 31B supplies the image data D1 to the image forming unit 358 and forms an image corresponding to the image data D1. The image forming unit 3513 forms an image corresponding to the image data D1 on a medium under the control of the controller 31B.

(3) User Information Updating Operation

Figure 15:
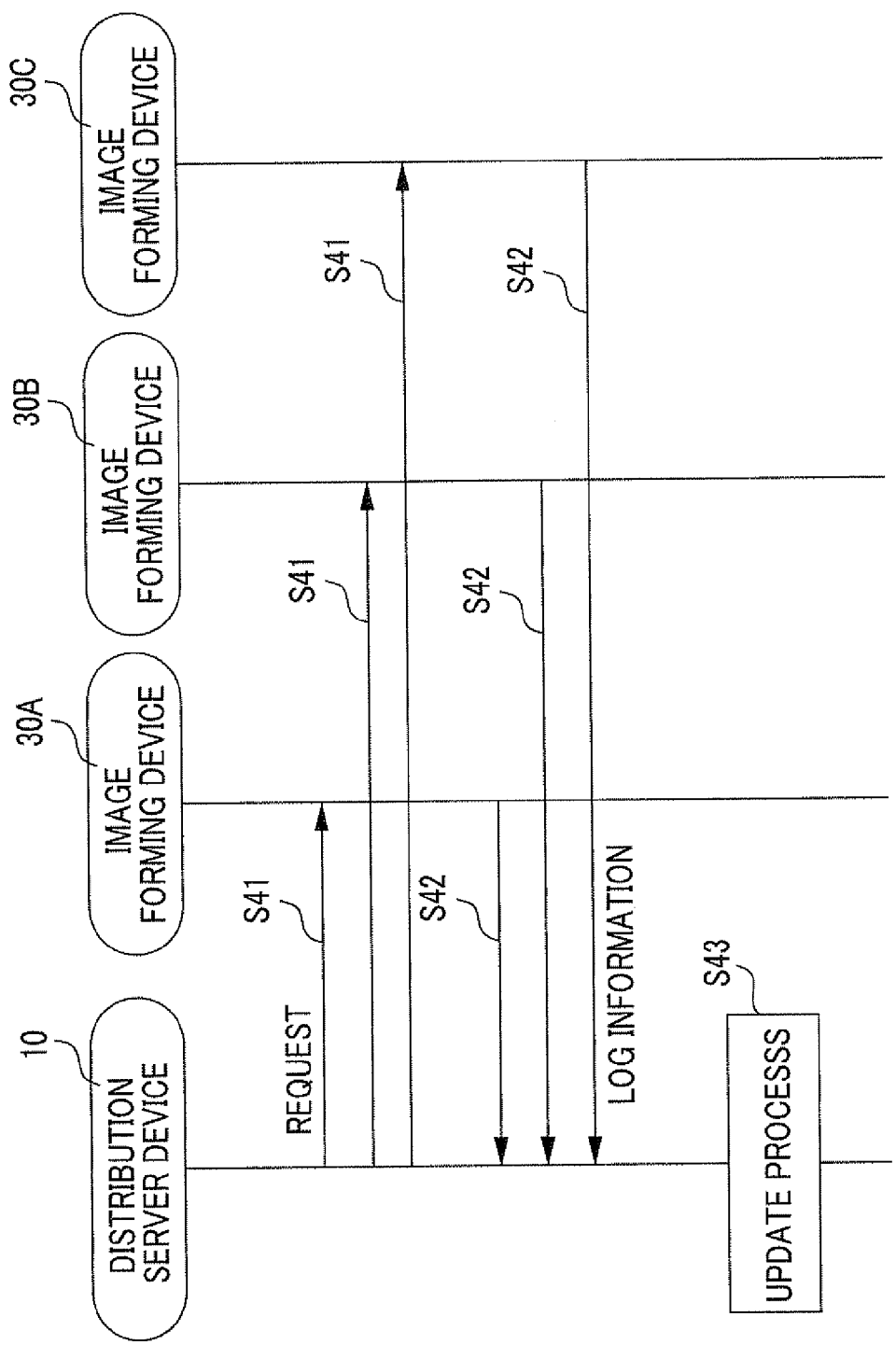
FIG. 15 is a sequence chart showing a user information updating process according to an exemplary embodiment.

The distribution server device 10 updates the user information 41 stored in the storage unit 14 depending on which image forming device 30 is frequently used by the user, for example. FIG. 15 is a sequence chart showing an operation of updating the user information 41. The image forming device 30 records log information 44 for each user ID. The log information 44 is information indicating the history of processing in the image forming device 30. The processing history includes the history of processing such as scanning or faxing as well as the history of printing. The log information 44 is stored in the storage unit 33.

FIG. 16 is a diagram showing an example of the log information 44. In the log information 44, a processing time, a user ID, and a processing type are stored in a correlated manner. The processing time is the time when processing is performed. The user ID is input by the user. The processing type is information indicating the type of processing. When the user ID "user001" is input and printing is performed, the controller 31 records the time "2011/9/9/10:30" when printing is performed, the user ID "user001," and the processing type "print" in the log information 44 in a correlated manner. In the following description, the processing history including the processing type "print" will be referred to as a "print log."

The distribution server device 10 acquires the log information 44 from each image forming device 30 at a predetermined time. Specifically, at a predetermined time, the CPU 11 controls the communication unit 13 to send a request for the log information 44 to the image forming devices 30A, 30B, and 30C (step S41). In response to this request, the image forming devices 30A, 30B, and 30C read the log information 44 from the storage units 33A, 33B, and 33C and transmit the log information 44 to the distribution server device 10 (step S42) Upon receiving the log information 44 from the image forming devices 30A, 30B, and 30C, the distribution server device 10 updates the user information 41 stored in the storage unit 14 based on the received log information 44 (step S43).

Figure 17:
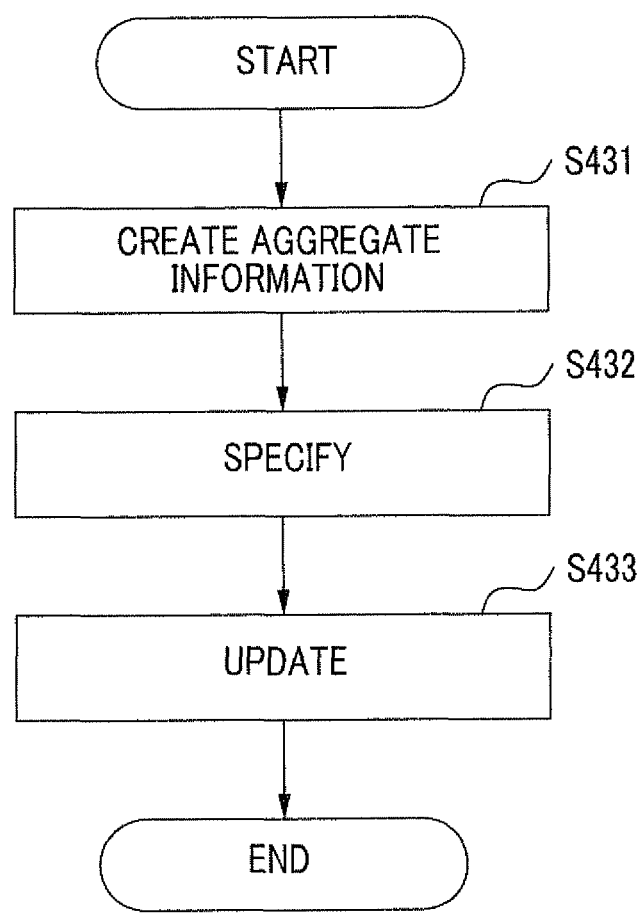
FIG. 17 is a flowchart showing a user information updating process.

FIG. 17 is a flowchart showing a process of updating the user information 41. The CPU 11 aggregates the log information 44 received from the image forming devices 30A, 30B, and 30C for each user ID to create aggregate information 45 (step S431). FIG. 18 is diagram showing an example of the aggregate information 45. In the aggregate information 45, a user ID and the print counts of the image forming devices 30A, 30B, and 30C are stored in a correlated manner. The user ID is included in the log information 44. The print count is calculated from the number of print logs included in the log information 44. For example, it is assumed that the log information 44 shown in FIG. 16 is received from the image forming device 30A. The log information 44 includes one print log corresponding to the user ID "user001." This means that printing corresponding to the user ID "user001" is performed once in the image forming device 30A. In this case, the CPU 11 adds "1" to the aggregate information 45 as the print count of the image forming device 30A corresponding to the user ID "user001." The CPU 11 calculates the print counts of the image forming devices 30B and 30C by the same method and adds the print counts to the aggregate information 45.

The CPU 11 specifies the user ID included in the aggregate information 45 and the image forming device 30 having the highest print count corresponding to the user ID among the image forming devices 30A, 30B, and 30C based on the created aggregate information 45 (step S432). In the aggregate information 45 shown in FIG. 18, the print count "1" of the image forming device 30A, the print count "5" of the image forming device 30B, and the print count "0" of the image forming device 30C are correlated with the user ID "user001." Then, the image forming device 30B has the highest print count corresponding to the user ID "user001" among the image forming devices 30A, 30B, and 30C. In this case, the CPU 11 specifies the user ID "user001" and the image forming device 30B. The CPU 11 performs this process with respect to all of the user IDs included in the aggregate information 45.

Moreover, the CPU 11 updates the user information 41 stored in the storage unit 14 so that the spooler information indicated by the specified image forming device 30 and the specified user ID are stored in a correlated manner (step S433). FIG. 19 is a diagram showing an example of the user information 41 after update. Specifically, the distribution server device 10 lowers, by one step, the priority order of the primary spooler information "spoolerA" and the secondary spooler information "spoolerC" correlated with the user ID "user001" in the user information 41 shown in FIG. 3. In this way, as shown in FIG. 19, the priority order of the primary spooler information "spoolerA" is changed from "1" to "2" and the priority order of the secondary spooler information "spoolerC" is changed from "2" to "3." Moreover, the CPU 11 stores the spooler information "spoolerB" indicating the specified image forming device 30B as the primary spooler information of the user ID "user001." In this way, as shown in FIG. 19, the user ID "user001" and the primary spooler information "spoolerB" are stored in a correlated manner.

(4) User Information Distributing Operation

The distribution server device 10 distributes the user information 41a corresponding to the latest user information 41 to the image forming device 30 in order to synchronize the user information 41 stored in the storage unit 14 with the user information 41a stored in the image forming device 30. Specifically, the CPU 11 reads the user information 41 from the storage unit 14 at a predetermined time (for example, once every night at midnight). The CPU 11 extracts the user ID, the primary spooler information, and the secondary spooler information from the user information 41 to create the user information 41a. The spooler information to which the priority order "3" is allocated is not included in the user information 41a. The CPU 11 controls the communication unit 13 to transmit the created user information 41a to the image forming devices 30A, 308, and 30C. Upon receiving the user information 41a from the distribution server device 10, the image forming devices 30A, 30B, and 30C store the user information 41a in the storage units 33A, 33B, and 33C, respectively. In this way, the user information 41a stored in the image forming device 30A, 308, and 30C is updated.

(5) Printer Driver Updating Operation

The spooler information set in the printer driver 42 is periodically updated so as to be synchronized with the user information 41 stored in the distribution server device 10. The updating is broadly classified into a pull-type method and a push-type method. Hereinafter, the respective methods will be described.

(i) Pull-Type

Figure 20:
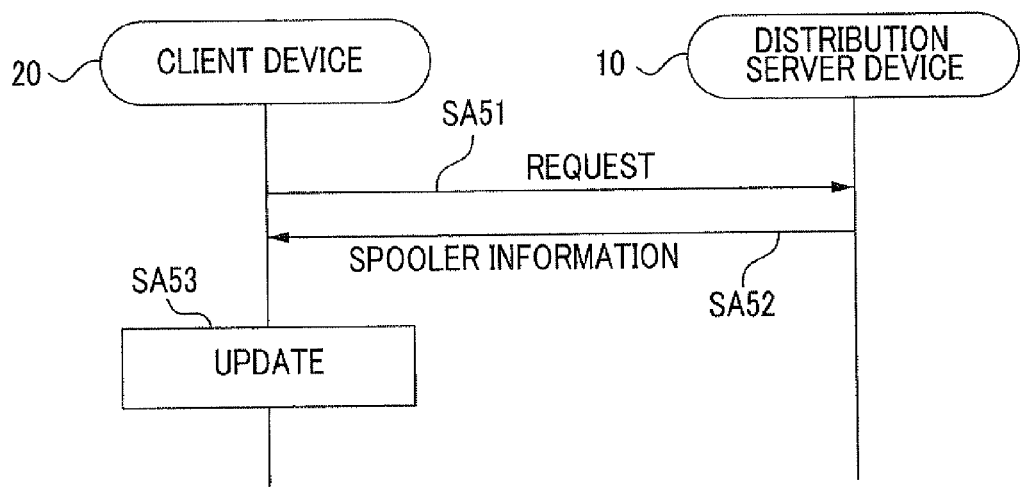
FIG. 20 is a sequence chart showing a pull-type updating operation.

FIG. 20 is a sequence chart showing a pull-type updating operation. An updating time is set in advance in the printer driver 42. The updating time is, for example, when the first print instruction on each day is received. When the updating time comes, the client device 20 acquires the latest spooler information from the distribution server device 10. Specifically, the CPU 21 controls the communication unit 23 to send a request for the spooler information corresponding to the user ID set in the printer driver 42 to the distribution server device 10 (step SA51). The distribution server device 10 reads the spooler information requested from the client device 20 from the storage unit 14 and transmits the spooler information to the client device 20 (step SA52). In the user information 41 shown in FIG. 19, the primary spooler information "spoolerB" and the secondary spooler information "spoolerA" are correlated with the user ID "user001." In this case, the CPU 11 extracts these spooler information from the user information 41 stored in the storage unit 14 and controls the communication unit 13 to transmit the spooler information to the client device 20. The spooler information "spoolerC" to which the priority order "3" is allocated is not transmitted to the client device 20.

Upon receiving the primary spooler information "spoolerB" and the secondary spooler information "spoolerA" from the distribution server device 10, the client device 20 updates the spooler information set in the printer driver 42 based on the received spooler information (step SA53). In this way, in the printer driver 42, the primary spooler information "spoolerB" and the secondary spooler information "spoolerA" are set instead of the primary spooler information "spoolerA" and the secondary spooler information "spoolerC" shown in FIG. 5.

(ii) Push-Type

Figure 21:
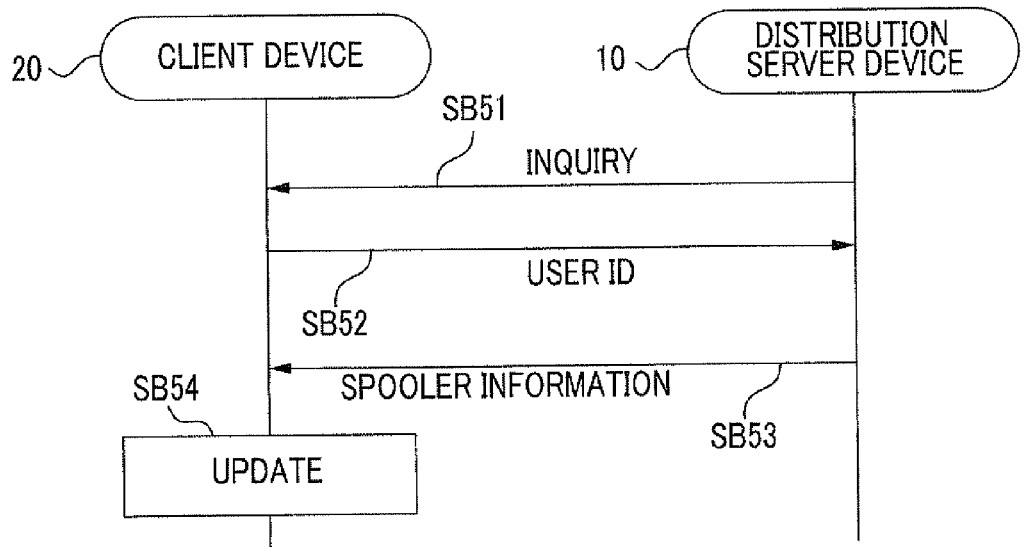
FIG. 21 is a sequence chart showing a push-type updating operation.

FIG. 21 is a sequence chart showing a push-type updating operation. An updating time is set in advance in the distribution server device 10. The updating time is once in 15 minutes, for example. When an updating time comes, the distribution server device 10 inquires to the client device 20 about the user ID set in the printer driver 42 (step SB51). As shown in FIG. 5, a user ID "user001" is set in the printer driver 42. In this case, the client device 20 returns the user ID to the distribution server device 10 (step SB52).

Upon receiving the user ID from the client device 20, the distribution server device 10 reads the spooler information corresponding to the user ID from the storage unit 14 and transmits the spooler information to the client device 20 (step SB53). In the user information 41 shown in FIG. 19, the primary spooler information "spoolerB" and the secondary spooler information "spoolerA" are correlated with the user ID "user001." In this case, the CPU 11 extracts these spooler information from the user information 41 stored in the storage unit 14 and controls the communication unit 13 to transmit the spooler information to the client device 20. The spooler information "spoolerC" to which the priority order "3" is allocated is not transmitted to the client device 20.

Upon receiving the primary spooler information "spoolerB" and the secondary spooler information "spoolerA" from the distribution server device 10, the client device 20 updates the spooler information set in the printer driver 42 based on the received spooler information (step SB54). In this way, in the printer driver 42, the primary spooler information "spoolerB" and the secondary spooler information "spoolerA" are set instead of the primary spooler information "spoolerA" and the secondary spooler information "spoolerC" shown in FIG. 5.

According to the exemplary embodiment described above, it is possible to decrease the time and labor of an operation of correlating the user ID with the spooler information indicating the image forming device 30 in which the image data corresponding to the user ID are stored. Moreover, in response to the updating of the user information 41 stored in the distribution server device 10, the spooler information set in the printer driver 42 of the client device 20 is updated. Thus, the image data are stored in the image forming device 30 corresponding to the user information 41 after updating.

3. Modification Examples

The present invention is not limited to the above-described exemplary embodiments but may be modified in the following ways. Moreover, the following modification examples may be combined with each other.

(1) Modification Example 1

In the first initial setting operation described above, the distribution server device 10 has specified the image forming device 30 having a facsimile function using the facsimile list 46. However, the distribution server device 10 may specify the image forming device 30 having a facsimile function without using the facsimile list 46. The following method may be used as a method which does not use the facsimile list 46, for example.

(i) Method 1

Function information indicating the function of the image forming device 30 is stored in the storage unit 33 of each image forming device 30. Information indicating whether the image forming device 30 has a facsimile function is included in the function information. The client device 20 acquires the function information stored in the storage unit 33 of each of the image forming devices 30A, 30B, and 30C from the image forming devices 30. The distribution server device 10 specifies the image forming device 30 having a facsimile function based on the function information received from the image forming device 30.

(ii) Method 2

The log information 44 indicating the history of processing performed by the image forming device 30 is stored in the storage unit 33 of each image forming device 30. Information (hereinafter referred to as a "facsimile log") indicating the history of faxing performed by the image forming device 30 is included in the log information. The distribution server device 10 acquires the log information 44 stored in the storage unit 33 of each of the image forming devices 30A, 30B, and 30C from the image forming devices 30. The distribution server device 10 specifies the image forming device 30 having a facsimile function based on the log information 44 acquired from each of the image forming devices 30. Specifically, when the facsimile log is included in the log information 44 received from the image forming device 30, the CPU 21 specifies the image forming device 30 as the image forming device 30 having a facsimile function.

(2) Modification Example 2

In the first initial setting operation described above, the image forming device 30 having a facsimile function is specified as the image forming device 30 which is unlikely to be turned off by the user. However, the image forming device 30 which is unlikely to be turned off by the user is not limited to the image forming device 30 having a facsimile function. For example, the image forming device 30 having a long power-on time may be specified as the image forming device 30 which is unlikely to be turned off by the user.

Figure 22:
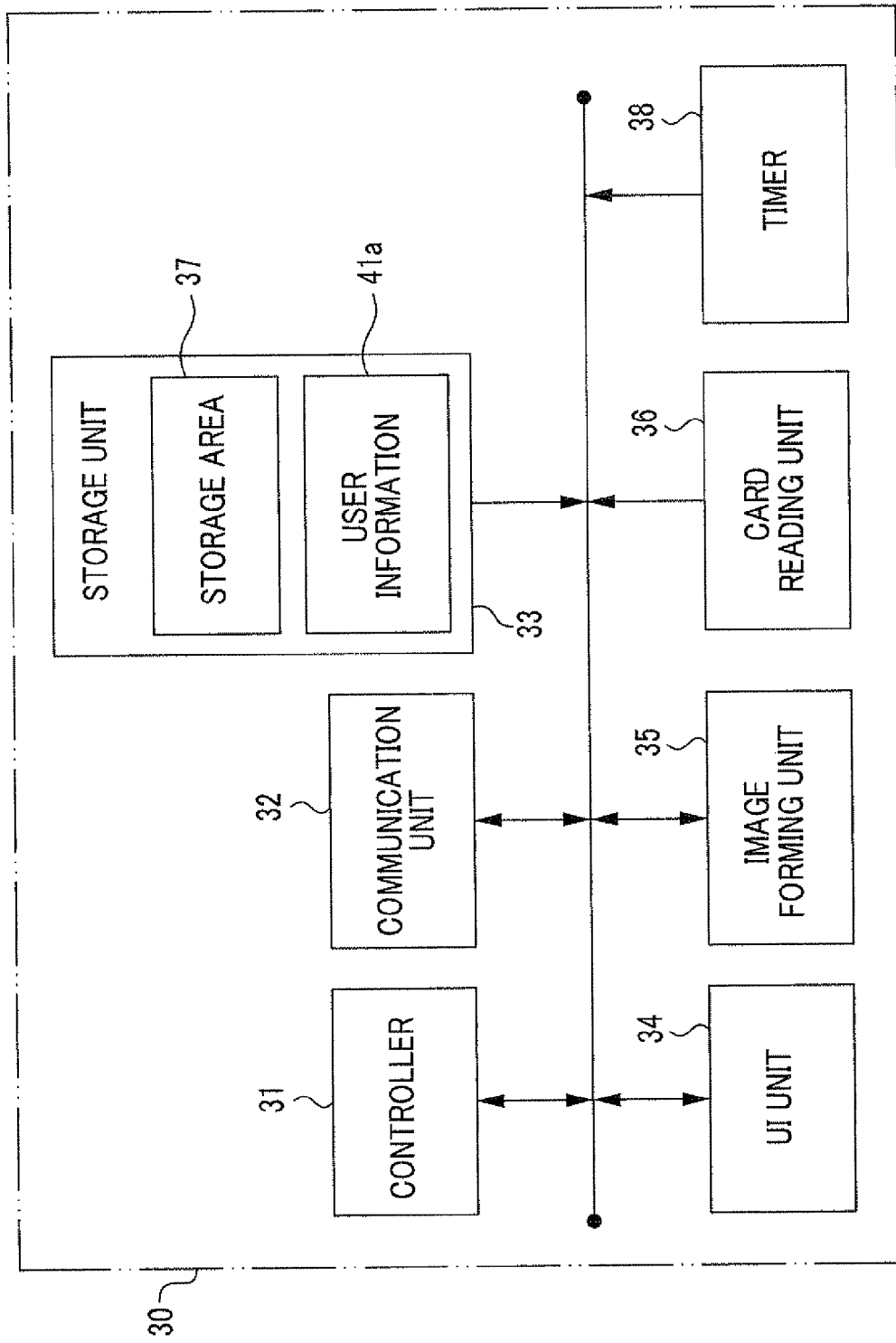
FIG. 22 is a diagram showing a hardware configuration of an image forming device according to Modification Example 2.

FIG. 22 is a diagram showing a hardware configuration of the image forming device 30 according to Modification Example 2. The image forming device 30 includes a timer 38 in addition to the hardware configuration of the image forming device 30 shown in FIG. 6. The timer 38 measures the power-on time of the image forming device 30. The power-on time is the time elapsed after the image forming device 30 is turned on. That is, in Modification Example 2, the timer 38 is used as a measuring unit. The distribution server device 10 acquires a power-on time measured by the timers 38A, 38B, and 38C from the image forming devices 30A, 30B, and 30C. The distribution server device 10 specifies the image forming device 30 having the longest power-on time among the image forming devices 30A, 30B, and 30C based on the power-on time acquired from each of the image forming devices 30. The distribution server device 10 determines the specified image forming device 30 as the secondary spooler.

(3) Modification Example 3

In the second initial setting operation described above, the client device 20 may determine the image forming device 30 selected by the user among the image forming devices 30 connected to the same sub-network as the own device. Specifically, when the spooler information are acquired from the image forming devices 30A, 30B, and 30C connected to the same sub-network as the own device, the CPU 21 displays the acquired spooler information on the display 26. The spooler information may include information allowing the user to identify the image forming device 30 such as the device name or a model name of each of the image forming devices 30A, 30B, and 30C. The user selects a desired primary spooler and a desired secondary spooler based on the spooler information displayed on the display 26 using the operation unit 25. In this example, it is assumed that the user selects the image forming device 30A as the primary spooler and the image forming device 30C as the secondary spooler. In this case, the CPU 21 sets the spooler information "spoolerA" indicating the image forming device 30A as the primary spooler information and the spooler information "spoolerC" indicating the image forming device 30C as the secondary spooler information.

(4) Modification Example 4

In the second initial setting operation described above, the client device 20 may set only the primary spooler information. In this case, the distribution server device 10 specifies the image forming device 30 which is unlikely to be turned off by the user and sets the spooler information indicating the specified image forming device 30 as the secondary spooler information. The image forming device 30 which is unlikely to be turned off by the user may be specified by the method described in the exemplary embodiment or the methods described in Modification Example 1 or 2.

(5) Modification Example 5

The time when the initial setting operation is performed is not limited to the time described in the exemplary embodiment. For example, in the first initial setting operation, the client device 20 may start the process of step Sa1 when the printer driver 42 is installed. Moreover, in the second initial setting operation, the client device 20 may start the process of step SB1 when the first print instruction is received.

(6) Modification Example 6

The updating time set in the printer driver 42 is not limited to when the first print instruction of the day is received. For example, the updating time may be when a print instruction is received after the elapse of a designated period from the time when the previous updating (or the initial setting operation) was performed. Alternatively, the updating time may be when a print instruction is received. In this case, the updating operation of the printer driver 42 is performed when the print instruction is received.

(7) Modification Example 7

Figure 23:
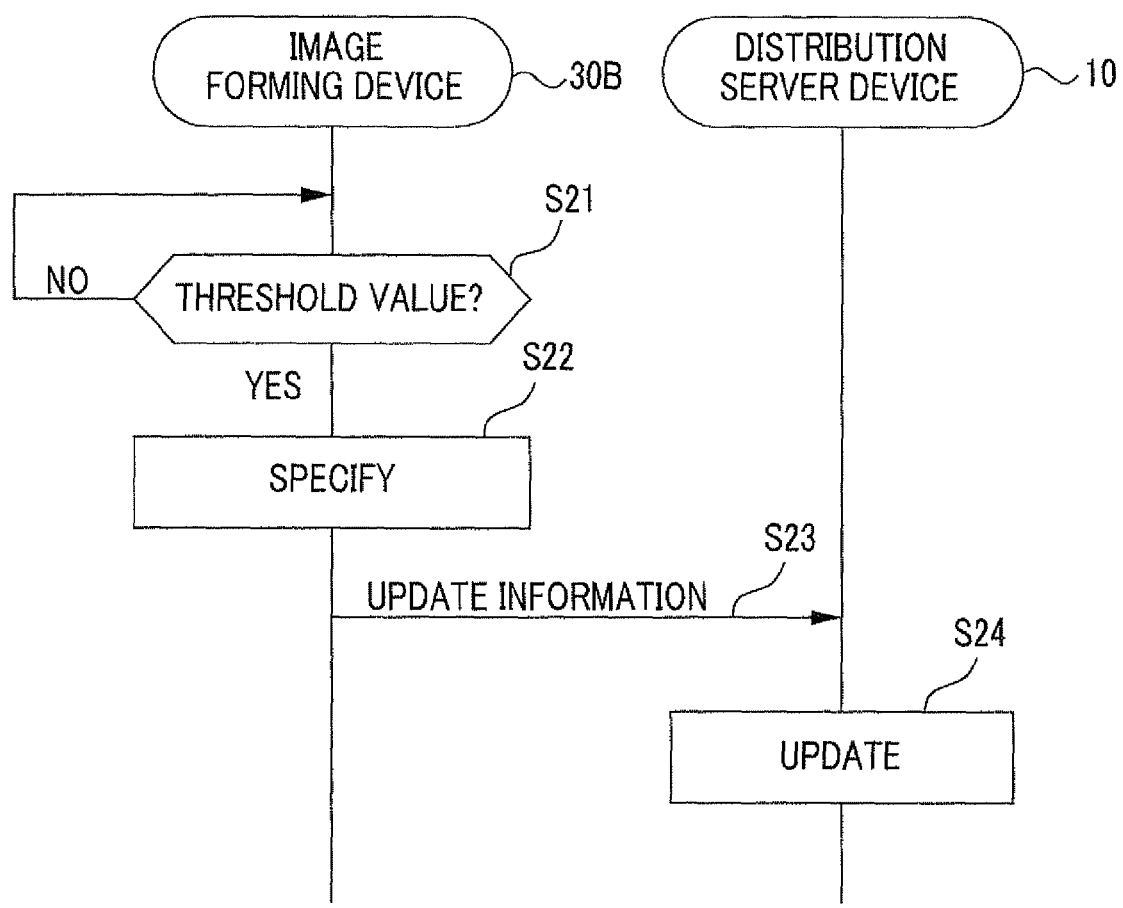
FIG. 23 is a sequence chart showing a user information updating operation according to Modification Example 7.

The updating operation of the user information 41 is not limited to the exemplary embodiment. For example, the image forming device 30 which is frequently used by the user may be determined on the image forming device 30 side. Moreover, the image forming device 30 which is frequently used by the user may be specified using the authentication count instead of the log information 44. FIG. 23 is a sequence chart showing an operation of updating the user information 41 according to Modification Example 7. The image forming device 30 records an authentication count for each user ID. Specifically, the controller 31 measures an authentication count of a user authentication process performed using each of the user IDs. However, the controller 31 does not measure an authentication count for a user ID in the user information 41a stored in the storage unit 33, which is correlated with spooler information indicating the own device.

Figure 24:
FIG. 24 is a diagram showing an example of recording information.

For example, when the image forming device 30B has performed a user authentication process using the user ID "user001," the controller 31B increases the authentication count corresponding to the user ID "user001" by 1. The controller 31 records the measured authentication count in recording information 43. The recording information 43 is stored in the storage unit 33. FIG. 24 is a diagram showing an example of the recording information 43 stored in the image forming device 30B. In the recording information 43, "5" is recorded as the authentication count corresponding to the user ID "user001." This represents that the image forming device 30S has performed the user authentication process "five times" using the user ID "user001." This authentication count is reset once a day, for example. Alternatively, the authentication count may be reset once several days. In this case, the authentication count is measured every several days.

When the authentication count recorded in the recording information 43 has reached a threshold value, the image forming device 30 specifies a user ID and an own device corresponding to the authentication count and notifies the distribution server device 10 of the spooler information indicating the user ID and the own device. Specifically, the controller 31 determines whether or not the authentication count included in the recording information 43 has reached a threshold value (step S21). In this example, it is assumed that the threshold value is "5."

When all of the authentication counts included in the recording information 43 have not reached the threshold value (step S21: NO), the controller 31B returns to step S21. On the other hand, in the recording information 43 shown in FIG. 24, for example, the authentication count corresponding to the user ID "user001" has reached the threshold value "5" (step S21: YES). In this case, the controller 312 specifies the user ID "user001" and the image forming device 30B (step S22). The controller 31B controls the communication unit 32B to transmit update information including the user ID "user001" and the spooler information "spoolerB" indicating the own device to the distribution server device 10 (step S23). In this way, the user ID specified in the image forming device 302 and the spooler information indicating the image forming device 30B are notified to the distribution server device 10.

Upon receiving the update information from the image forming device 30, the distribution server device 10 updates the user information 41 stored in the storage unit 14 at a predetermined time (for example, once every night at midnight) (step S24). Specifically, as shown in FIG. 19, the CPU 11 lowers, by one step, the priority order of the primary spooler information "spooler" and the secondary spooler information "spoolerC" correlated with the user ID "user001." Moreover, the CPU 11 stores the spooler information "spoolerB" received from the image forming device 30B as the primary spooler information of the user ID "user001." When plural update information including the same user ID are received from the image forming device 30, the distribution server device 10 performs the process of step S24 based on the update information received lately.

(8) Modification Example 8

The operation of updating the user information 41 is not limited to the operation described in the exemplary embodiment and Modification Example 7. In Modification Example 7 described above, for example, in the image forming device 30B, when the authentication count corresponding to the user ID "user001" has reached a threshold value, the user information 41 stored in the distribution server device 10 is updated, and the spooler information "spoolerB" indicating the image forming device 30B is stored as the primary spooler information of the user ID "user001" as shown in FIG. 19. However, the user may also frequently use the image forming device 30A in addition to the image forming device 30B, indicated by the primary spooler information "spoolerA" correlated with the user ID "user001" in the user information 41 before updating shown in FIG. 3. In this case, if the user information 41 is updated, a problem may occur. Therefore, the image forming system 1 has a structure such that the user information 41 is not updated in such a case.

FIG. 25 is a sequence chart showing an operation of updating the user information 41 according to Modification Example 8. The image forming device 30 records the authentication count for each user ID similarly to Modification Example 7 described above. However, in Modification Example 8, the image forming device 30 also measures the authentication count of the user ID which is correlated with the spooler information indicating the own device in the user information 41a. When the authentication count recorded in the recording information 43 has reached a threshold value, the image forming device 30 specifies the user ID and the own device corresponding to the authentication count similarly to steps S21 and S22 described above (steps S31 and S32). In this example, it is assumed that the user ID "user001" and the image forming device 30B are specified in the image forming device 30B.

In this case, the image forming device 30B inquires to the other image forming devices 30 indicated by the spooler information correlated with the user ID "user001" in the user information 41a stored in the storage unit 33B about whether or not the authentication count of the other image forming devices 30 corresponding to the user ID has reached a threshold value (step S33). Specifically, in the user information 41a shown in FIG. 7, the primary spooler information "spoolerA" is correlated with the user ID "user001." In this case, the controller 31B controls the communication unit 32B to inquire to the image forming device 30A indicated by the primary spooler information about whether or not the authentication count of the image forming device 30A corresponding to the user ID "user001" has reached a threshold value.

The image forming device 30A responds as to whether the authentication count inquired from the image forming device 30B is equal to or larger than the threshold value based on the authentication count recorded in the recording information 43 (step S34). Specifically, the controller 31A determines whether or not the authentication count corresponding to the user ID "user001" in the recording information 43 stored in the storage unit 33A is equal to or larger than the threshold value. When the authentication count corresponding to the user ID "user001" is equal to or larger than the threshold value, the controller 31R controls the communication unit 32A to transmit response information to the image forming device 30B, indicating that the authentication count is equal to or larger than the threshold value. On the other hand, when the authentication count corresponding to the user ID "user001" is smaller than the threshold value, the controller 31A controls the communication unit 32A to transmit response information to the image forming device 30B, indicating that the authentication count is smaller than the threshold value.

When there is a response from the image forming device 30A, indicating that the authentication count corresponding to the user ID "user001" is smaller than the threshold value (step S35: "smaller than threshold value"), the image forming device 30B transmits update information including the user ID "user001" and the spooler information "spoolerB" of the own device to the distribution server device 10 similarly to step S23 (step S36). In this way, the spooler information "spoolerB" indicating the image forming device 30B and the user ID "user001" are notified to the distribution server device 10. Upon receiving update information from the image forming device 30B, the distribution server device 10 updates the user information 41 stored in the storage unit 14 similarly to step S24 described above (step S37).

On the other hand, when there is a response from the image forming device 30A, indicating that the authentication count corresponding to the user ID "user001" is equal to or larger than the threshold value (step S35: equal to or larger than threshold value), the image forming device 30B ends this process without transmitting the update information. That is, when there is a response from the image forming device 30A, indicating that the authentication count is equal to or larger than the threshold value, the image forming device 30B does not notify the spooler information and the user ID. In this case, the user information 41 is not updated in the distribution server device 10.

(9) Modification Example 9

In Modification Example 7 or 8 described above, the image forming device 30 may determine whether a print count corresponding to the user ID has reached a threshold value using a print log instead of the authentication count. In this case, the image forming device 30 records the log information 44 for each user ID as described in the exemplary embodiment. The image forming device 30 aggregates the log information 44 for each user ID to create the aggregate information 45 similarly to step S431 described above. The image forming device 30 proceeds to step S22 or S32 when the print count included in the created aggregate information 45 reaches the threshold value.

The image forming device 30 has plural functions such as a scanner or a facsimile in addition to the print function. In this case, the user may use the image forming device 30 in order to perform processing other than the printing. Then, it may not be said that the image forming device 30 having the high authentication count is always the image forming device 30 having the high use frequency, used when the user performs printing. In Modification Example 9, the print log is used instead of the authentication count. Thus, according to Modification Example 9, image data corresponding to the user ID are stored in the image forming device 30 having the highest printing frequency corresponding to the user ID.

(10) Modification Example 10

In the exemplary embodiment described above, the distribution server device 10 may specify the image forming device 30 having the highest authentication count using the authentication count instead of the print log. In this case, the image forming device 30 records the authentication history for each user ID as described in Modification Example 8 described above. The distribution server device 10 acquires the authentication history from the image forming devices 30A, 30B, and 30C in steps S41 and S42 described above. In step S43, the distribution server device 10 calculates the authentication count performed using the user ID in each image forming device 30 based on the authentication history acquired from the image forming devices 30A, 30B, and 300 and specifies the user ID and the image forming device 30 having the highest authentication count corresponding to the user ID among the image forming devices 30A, 30B, and 300. Moreover, the distribution server device 10 updates the user information 41 stored in the storage unit 14 based on the specified image forming device 30 and the specified user ID similarly to step S433 described above. In Modification Example 10, since the log information 44 is not used, the image forming device 30 does not need to record the log information 44.

(11) Modification Example 11

The function of the distribution server device 10 may be performed by any of the image forming devices 30 instead of the distribution server device 10. The image forming device 30 performs the function of the distribution server device 10 is determined in advance. In the following description, the image forming device 30 will be referred to as a "master device." In this case, the user information 41 is stored in the storage unit 33 of the master device similarly to the distribution server device 10. The master device performs the initial setting operation described above, the operation of updating and distributing the user information, and the operation of updating the printer driver similarly to the distribution server device 10. For example, when performing the operation of updating the user information 41 according to the exemplary embodiment, the master device acquires the log information 44 from the other image forming devices 30. Moreover, the master device specifies the image forming device 30 having the highest print count among the image forming devices 30A, 30B, and 30C based on the log information 44 stored in the storage unit 33 and the log information 44 acquired from the other image forming devices 30.

The master device may be provided in each sub-network. In this case, when distributing the user information 41a to the other image forming devices 30, the master device may distribute the user information 41a to only the other image forming devices 30 provided in the same sub-network. Moreover, the master device may be changed dynamically. For example, a priority order concerning the master device is set in each image forming device 30. In general, the image forming device 30 having the highest priority order becomes the master device. However, for example, in a state where it is not possible to use the image forming device 30 having the highest priority order such as when power is turned off, the image forming device 30 having the next highest priority order becomes the master device. The states of the image forming devices 30 are checked by periodically transmitting the echo request described above to each other, for example.

(12) Modification Example 12

The user authentication process has been performed in the image forming device 30. However, the user authentication process may be performed on the distribution server device 10 side. In this case, the image forming device 30 sends a request for the user authentication process to the distribution server device 10. Specifically, the controller 31 controls the communication unit 32 to transmit the user ID input by the user to the distribution server device 10. In response to the request from the image forming device 30, the distribution server device 10 performs the same process as step S132 described above and responds as to whether or not authentication is successful. When there is a response from the distribution server device 10, indicating that authentication has failed, the image forming device 30 proceeds to step S133 described above. On the other hand, when there is a response from the distribution server device 10, indicating that authentication has been successful, the image forming device 30 proceeds to step S14 described above.

Similarly to Modification Example 11 described above, when the master device performs the function of the distribution server device 10, the user authentication process may be performed on the master device side. In this case, the image forming device 30 other than the master device sends a request for the user authentication process to the master device. In response to the request, the master device performs the user authentication process and responds as to whether or not authentication is successful.

(13) Modification Example 13

When image data are transmitted from the client device 20, there may be a case where it is not possible to use the image forming device 30 indicated by the primary spooler information and the image forming device 30 indicated by the secondary spooler information. In this case, the client device 20 may acquire spooler information other than the primary spooler information and the secondary spooler information corresponding to the user ID set in the printer driver 42 from the distribution server device 10 and transmit image data to the image forming device 30 indicated by the spooler information.

(14) Modification Example 14

In the user information 41a stored in the image forming device 30, the primary spooler information and the secondary spooler information are included. However, the number of spooler information included in the user information 41a is not limited to 2. For example, only one spooler information may be included, and three spooler information or more may be included. The number of spooler information included in the user information 41a is determined in advance. That is, a predetermined number of spooler information selected based on the priority order are included in the user information 41a. Alternatively, all of the spooler information in the user information 41 stored in the distribution server device 10 so as to be correlated with the user ID may be included in the user information 41a.

(15) Modification Example 15

In the user information distributing operation, only a difference from the user information 41a distributed previously may be distributed. In this case, the image forming device 30 updates only the user information 41a corresponding to the difference received from the distribution server device 10.

(16) Modification Example 16

The user ID described above is an example of the user information for identifying the user. The user information is not limited to the user ID. For example, the user information may be a card ID allocated to an IC card provided to the user and may be a mail address allocated to the user. Moreover, as described above, since the IC card is provided every user, the card ID allocated to the IC card may be used as the user information.

(17) Modification Example 17

The user authentication process may be performed without using the IC card. For example, the user may input the user ID thereof using the UI unit 34 of the image forming device 30. In this case, the UI unit 34 is used as the receiving unit that receives the user information input by the user. Moreover, biological information such as a fingerprint may be used instead of the user ID. In this case, a device for reading the biological information is provided in the image forming device 30. In this case, this device is used as the receiving unit that receives the user information input by the user.

(18) Modification Example 18

The user authentication process may be performed using a user ID and a password. In this case, the user ID and the password are stored in the user information 41 in a correlated manner. When performing the authentication process, the user input the password using the UI unit 34, for example.

(19) Modification Example 19

In the print operation described above, after the image data list 50 is displayed, image data selected by the user are acquired. However, it is not always necessary to display the image data list 50. For example, after the user authentication process of step S13 described above, the image data may be acquired without acquiring the attribute information. In this case, the image forming device 30 sends a request for the image data corresponding to the user ID to the image forming devices indicated by the primary spooler information and the secondary spooler information stored in the user information 41*a* so as to be correlated with the input user ID. In this case, the user does not need to select the image data.

(20) Modification Example 20

The configuration of the image forming system 1 is not limited to the configuration shown in FIG. 1. For example, the number of image forming devices 30 may be increased in accordance with the number of users. Moreover, a number of client devices 20 may be provided so as to correspond to the number of users.

(21) Modification Example 21

The image forming unit 35 may be a printer that forms an image by a method other than the electrophotographic method. Moreover, the image forming unit 35 may be one which forms a monochrome image and may be one which forms a color image. Although the UI unit 34 includes a touch panel used as a display, the UI unit 34 may include a display device such as a liquid crystal display instead of the touch panel.

(22) Modification Example 22

The program executed by the CPU 11, the CPU 21, or the CPU of the controller 31 may be provided in a state of being recorded in a recording medium such as a magnetic tape, a magnetic disk, a flexible disk, an optical disc, an optomagnetic disc, or a memory and may be installed in the distribution server device 10, the client device 20, or the image forming device 30. Moreover, the program may be downloaded to the distribution server device 10, the client device 20, or the image forming device 30 via a communication line such as the Internet.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments were chosen and described in order to best explain the principles of the present invention and its practical applications, thereby enabling others skilled in the art to understand the present invention for various exemplary embodiments and with the various modifications as are suited to the particular use contemplated. It is intended that the scope of the present invention be defined by the following claims and their equivalents.

What is claimed is:
1. An image forming system comprising:
a plurality of image forming devices;
a determining unit that determines, before a user instructs printing of a print job, two or more image forming devices in which image data corresponding to user information is to be stored among a plurality of image forming devices;
a first storage unit that stores the user information and device information indicating the two or more image forming devices determined by the determining unit in a correlated manner;
a transmitting device in which the user information is preset;
a transmitting unit that is provided in the transmitting device and transmits image data corresponding to the preset user information to one of two or more image forming devices determined by the determining unit with respect to the user information;
a second storage unit that is provided in each of the two or more image forming devices and stores the image data transmitted by the transmitting unit;
a receiving unit that is provided in each of the plurality of image forming devices and receives an input of the user information;
a first acquiring unit that is provided in each of the plurality of image forming devices and acquires image data corresponding to the input user information from at least one of the two or more image forming devices correlated with the input user information indicated by the device information stored in the first storage unit; and
an image forming unit that is provided in each of the plurality of image forming devices and forms an image corresponding to the image data acquired by the first acquiring unit,
wherein the determining unit determines an image forming device, based on a facsimile function being present in the image forming device and not present among the two or more image forming devices, and the determining unit includes the image forming device in the two or more image forming devices determined by the determining unit as corresponding to the user information of the user.
2. The image forming system according to claim 1,
wherein the transmitting device and the plurality of image forming devices are connected via a communication line, wherein the communication line is divided into a plurality of sub-networks, and wherein when the transmitting device is connected to a single sub-network, the determining unit determines an image forming device connected to the single sub-network.

3. The image forming system according to claim 2, further comprising:

an updating unit that updates the device information stored in the first storage unit; and a second acquiring unit that is provided in the transmitting device and acquires device information stored in the first storage unit so as to be correlated with the preset user information at a predetermined time, wherein when the device information is acquired by the second acquiring unit, the transmitting unit transmits image data corresponding to the preset user information to an image forming device indicated by the device information.

4. The image forming system according to claim 1, further comprising:

an updating unit that updates the device information stored in the first storage unit; and a second acquiring unit that is provided in the transmitting device and acquires device information stored in the first storage unit so as to be correlated with the preset user information at a predetermined time, wherein when the device information is acquired by the second acquiring unit, the transmitting unit transmits image data corresponding to the preset user information to an image forming device indicated by the device information.

5. An image forming system comprising:

a plurality of image forming devices;

a determining unit that determines, before a user instructs printing of a print job, two or more image forming devices in which image data corresponding to user information is to be stored among a plurality of image forming devices;

a first storage unit that stores the user information and device information indicating the two or more image forming devices determined by the determining unit in a correlated manner;

a transmitting device in which the user information is preset;

a transmitting unit that is provided in the transmitting device and transmits image data corresponding to the preset user information to one of two or more image forming devices determined by the determining unit with respect to the user information;

a second storage unit that is provided in each of the two or more image forming devices and stores the image data transmitted by the transmitting unit;

a receiving unit that is provided in each of the plurality of image forming devices and receives an input of the user information;

a first acquiring unit that is provided in each of the plurality of image forming devices and acquires image data corresponding to the input user information from at least one of the two or more image forming devices correlated with the input user information indicated by the device information stored in the first storage unit;

an image forming unit that is provided in each of the plurality of image forming devices and forms an image corresponding to the image data acquired by the first acquiring unit;

a measuring unit that is provided in each of the plurality of image forming devices and measures a power-on time of an own image forming device;

a power-on time acquiring unit that acquires the power-on times of the plurality of image forming devices; and a specifying unit that specifies an image forming device having the longest power-on time acquired by the power-on time acquiring unit among the plurality of image forming devices, wherein the determining unit includes the image forming device specified by the specifying unit in the two or more image forming devices that were previously determined.

6. The image forming system according to claim 5, further comprising:

an updating unit that updates the device information stored in the first storage unit; and a second acquiring unit that is provided in the transmitting device and acquires device information stored in the first storage unit so as to be correlated with the preset user information at a predetermined time, wherein when the device information is acquired by the second acquiring unit, the transmitting unit transmits image data corresponding to the preset user information to an image forming device indicated by the device information.

* * * * *